(12) United States Patent
Maeda

(10) Patent No.: US 12,124,686 B2
(45) Date of Patent: Oct. 22, 2024

(54) INFORMATION PROCESSING METHOD, SYSTEM, INFORMATION PROCESSING DEVICE, AND PROGRAM

(71) Applicant: CASIO COMPUTER CO., LTD., Tokyo (JP)

(72) Inventor: Naoya Maeda, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/026,496

(22) PCT Filed: Jul. 26, 2021

(86) PCT No.: PCT/JP2021/027520
§ 371 (c)(1),
(2) Date: Mar. 15, 2023

(87) PCT Pub. No.: WO2022/059349
PCT Pub. Date: Mar. 24, 2022

(65) Prior Publication Data
US 2023/0342013 A1 Oct. 26, 2023

(30) Foreign Application Priority Data

Sep. 16, 2020 (JP) .................... 2020-155137
Jul. 8, 2021 (JP) .................... 2021-113379

(51) Int. Cl.
*G06F 3/048* (2013.01)
*G06F 3/04842* (2022.01)
(Continued)

(52) U.S. Cl.
CPC ...... *G06F 3/04842* (2013.01); *G06F 3/04847* (2013.01); *G06F 3/0488* (2013.01)

(58) Field of Classification Search
CPC ............ G06F 3/04842; G06F 3/04847; G06F 3/0488; G06F 40/111; G06F 15/02
See application file for complete search history.

(56) References Cited

U.S. PATENT DOCUMENTS 6,795,838 B1 * 9/2004 Kataoka ................ G06F 40/111
382/187
9,323,719 B2 * 4/2016 Kamitani ................ G06F 3/167
(Continued)

FOREIGN PATENT DOCUMENTS

CN 101436309 A 5/2009
JP 1987253717 B * 10/1987
(Continued)

OTHER PUBLICATIONS

International Search Report dated Oct. 12, 2021 issued PCT/JP2021/027520.
(Continued)

*Primary Examiner* — Rashawn N Tillery
(74) *Attorney, Agent, or Firm* — Scully, Scott, Murphy & Presser, P.C.

(57) ABSTRACT

An information processing method includes determining a type of a selected character, among a plurality of characters included in a displayed mathematical expression, that is selection-operated by a user; identifying, based on the determined type of the selected character, an associated character, among the plurality of characters, that is associated with the character that is selection-operated; and setting, a range including the selected character and the associated character among the plurality of characters as a selection range of the character selected by the user.

18 Claims, 20 Drawing Sheets

(51) Int. Cl.
*G06F 3/04847* (2022.01)
*G06F 3/0488* (2022.01)

(56) References Cited

U.S. PATENT DOCUMENTS

| | | | | |
|---|---|---|---|---|
| 2013/0067306 A1* | 3/2013 | Bhargav | ............ | G06F 3/0482 715/220 |
| 2013/0290391 A1* | 10/2013 | Kamitani | ............ | G06F 15/02 708/160 |
| 2014/0282158 A1* | 9/2014 | Wolfram | ............ | G06F 3/04812 715/767 |
| 2018/0089177 A1* | 3/2018 | Cho | ............ | G06F 16/3344 |
| 2018/0357207 A1* | 12/2018 | Yi | ............ | G06F 40/131 |
| 2019/0317664 A1* | 10/2019 | Akae | ............ | G06F 3/0482 |
| 2020/0073918 A1* | 3/2020 | Mckay | ............ | G06F 40/232 |
| 2022/0092832 A1* | 3/2022 | Maeda | ............ | G06F 3/04886 |

FOREIGN PATENT DOCUMENTS

| | | | | | |
|---|---|---|---|---|---|
| JP | H09198375 | A | | 7/1997 | |
| JP | H10187668 | A | | 7/1998 | |
| JP | 2004086621 | A | * | 3/2004 | |
| JP | 2011141592 | A | * | 7/2011 | |
| JP | 2012053547 | A | * | 3/2012 | |
| JP | 2013015961 | A | * | 1/2013 | |
| JP | 2013030146 | A | * | 2/2013 | ............ G06F 17/215 |
| JP | 2013134633 | A | * | 7/2013 | ............ G06F 17/215 |
| JP | 2014530411 | A | | 11/2014 | |
| WO | WO-2010102639 | A1 | * | 9/2010 | ............ G06F 3/0481 |
| WO | WO-2019239400 | A1 | * | 12/2019 | ............ G06F 40/111 |

OTHER PUBLICATIONS

Japanese Office Action dated Nov. 8, 2022 issued in JP 2021-113379.

* cited by examiner

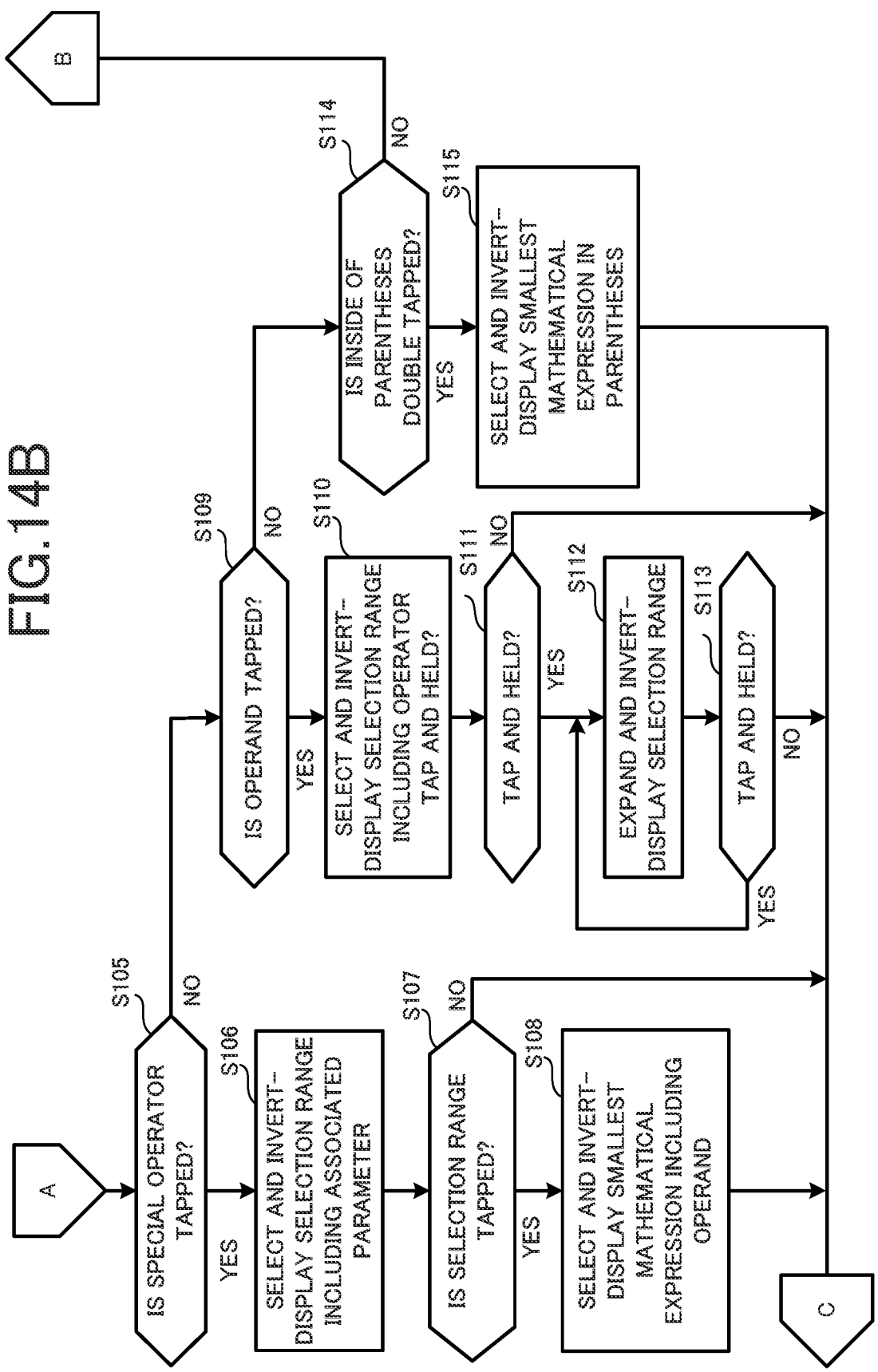

INFORMATION PROCESSING METHOD, SYSTEM, INFORMATION PROCESSING DEVICE, AND PROGRAM

TECHNICAL FIELD

The present disclosure relates to an information processing method, a system, an information processing device, and a program.

BACKGROUND ART

In recent years, the use of tablets, smartphones, and other electronic devices provided with a touch panel has increased, and mathematical expression input software that can be used by such touch panels has been proposed. For example, Patent Literature 1 describes technology for a mathematical expression input method in which a desired mathematical expression is selected from a list of mathematical expressions displayed in accordance with a touch input from a user, and values of parameters included in the selected mathematical expression can be set.

CITATION LIST

Patent Literature

Patent Literature 1: Unexamined Japanese Patent Application Publication (Translation of PCT Application) No. 2014-530411

SUMMARY OF INVENTION

Technical Problem

In the technology described in Patent Literature 1, when setting the values of the parameters included in the mathematical expression, the parameters to be set are selected in accordance with a touch input performed by a user. However, in some cases, parameters of appropriate ranges cannot be selected due to the size of the finger of the user that touches the touch panel, or the manner in which the user touches the touch panel. Such cases necessitate an operation for re-selecting the parameters, adjusting a selection range of characters by a draw gesture operation, or the like. In particular, in the case of a long and complex mathematical expression, adjusting the selection range of characters by a draw operation is highly difficult. As such, there is a problem in that the selection of appropriates ranges of characters in mathematical expressions is complicated. Additionally, this problem also similarly applies to cases in which the user selects a range using a mouse operation instead of a touch operation.

The present disclosure is made with the view of the above situation, and an objective of the present disclosure is to provide an information processing method, a system, an information processing device, and a program whereby a user can simply select an appropriate range of characters in a mathematical expression.

Solution to Problem

An information processing method according to the present disclosure that achieves the objective described above includes:

determining a type of a selected character, among a plurality of characters included in a displayed mathematical expression, that is selection-operated by a user;

identifying, based on the determined type of the selected character, an associated character, among the plurality of characters, that is associated with the character that is selection-operated; and setting, a range including the selected character and the associated character among the plurality of characters as a selection range of the character selected by the user.

Advantageous Effects of Invention

According to the present disclosure, a user can simply select an appropriate range of characters in a mathematical expression.

BRIEF DESCRIPTION OF DRAWINGS

FIG. 14B is a flowchart of a continuation of the flowchart, illustrating the flow of the selection range copy processing, illustrated in FIG. 14A;

DESCRIPTION OF EMBODIMENTS

Figure 1:
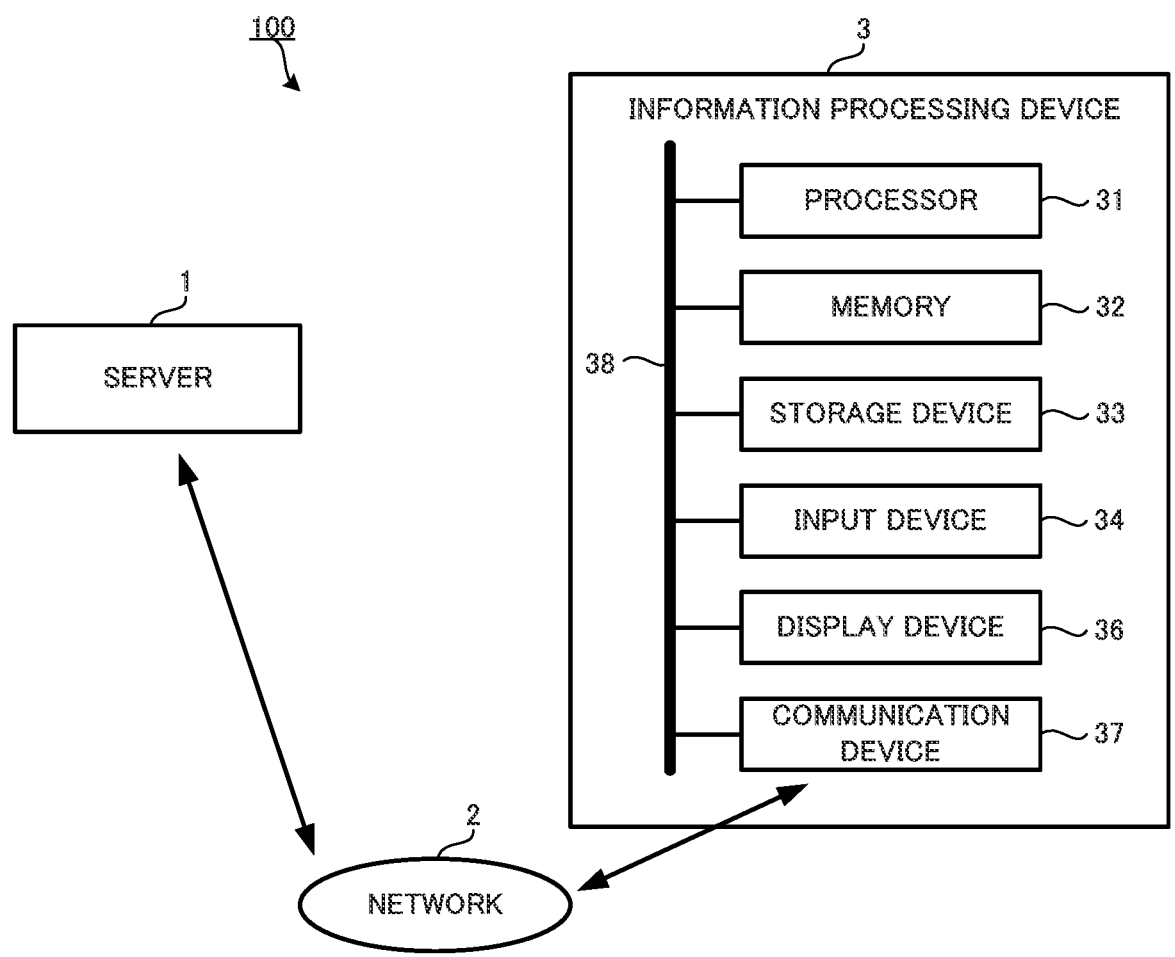
FIG. 1 is a drawing illustrating an example of a configuration of a system including an information processing device according to an embodiment of the present disclosure.

Hereinafter, embodiments of the present disclosure are described in detail while referencing the drawings. Note that, in the drawings, identical or corresponding components are denoted with the same reference numerals.

In an information processing device 3 according to an embodiment of the present disclosure, a range of a selection is determined in accordance with a character tapped by a user and a type of the tap on a mathematical expression displayed on a display screen. FIG. 1 is a drawing illustrating an example of the configuration of a system 100 including the information processing device 3. The system 100 includes a server 1 and the information processing device 3. The information processing device 3 is communicably connected to the server 1 via a network 2.

The server 1 receives, from the information processing device 3, mathematical expressions, computation commands, and data for computation, computes the data on the basis of the received mathematical expressions and computation commands, and sends computation results to the information processing device 3. The network 2 is a communication network that communicably connects the server 1 and the information processing device 3 to each other. In one example, the network 2 is the internet.

The information processing device 3 is a terminal device such as, for example, a smartphone, a tablet, or the like. As one example of the configuration of the information processing device 3, the information processing device 3 includes a processor 31, a memory 32, a storage device 33, an input device 34, a display device 36, and a communication device 37. The processor 31, the memory 32, the storage device 33, the input device 34, the display device 36, and the communication device 37 are each connected to each other via a bus 38.

The processor 31 reads out various programs stored in the storage device 33, deploys the programs in the memory 32, and executes the programs. The processor 31 can, for example, be configured using a processing device such as a central processing unit (CPU), a micro-processing unit (MPU), or the like. The memory 32 can be configured using a storage medium and a storage element such as volatile or nonvolatile semiconductor memory such as random access memory (RAM), flash memory or the like.

The storage device 33 is a device that stores the various programs executed by the processor 31, and various data for use by the various programs. The storage device 33 can, for example, be configured using a storage device such as a hard disk drive (HDD), a solid state drive (SSD), or the like.

The input device 34 is a device that receives inputs from the user. The input device 34 can, for example, be configured using a device on which touch inputs can be performed, such as a tablet, a digitizer, or the like. The display device 36 displays various types of information such as the data, the mathematical expressions, the computation commands, and the like. The display device 36 can be configured using a display device such as a liquid crystal display (LCD), an organic electroluminescence (EL) monitor, or the like. In the present embodiment, the input device 34 is mounted on the display device 36 and, as a result, functions as a touch panel serving as both an inputter and a display.

The communication device 37 communicates with the server 1 via the network 2, and sends and receives the various data. The communication device 37 can, for example, be configured from various devices provided with a communication method capable of connecting to the network 2. Examples of such communication methods include wireless LAN, Wi-Fi (registered trademark), and the like.

Figure 2:
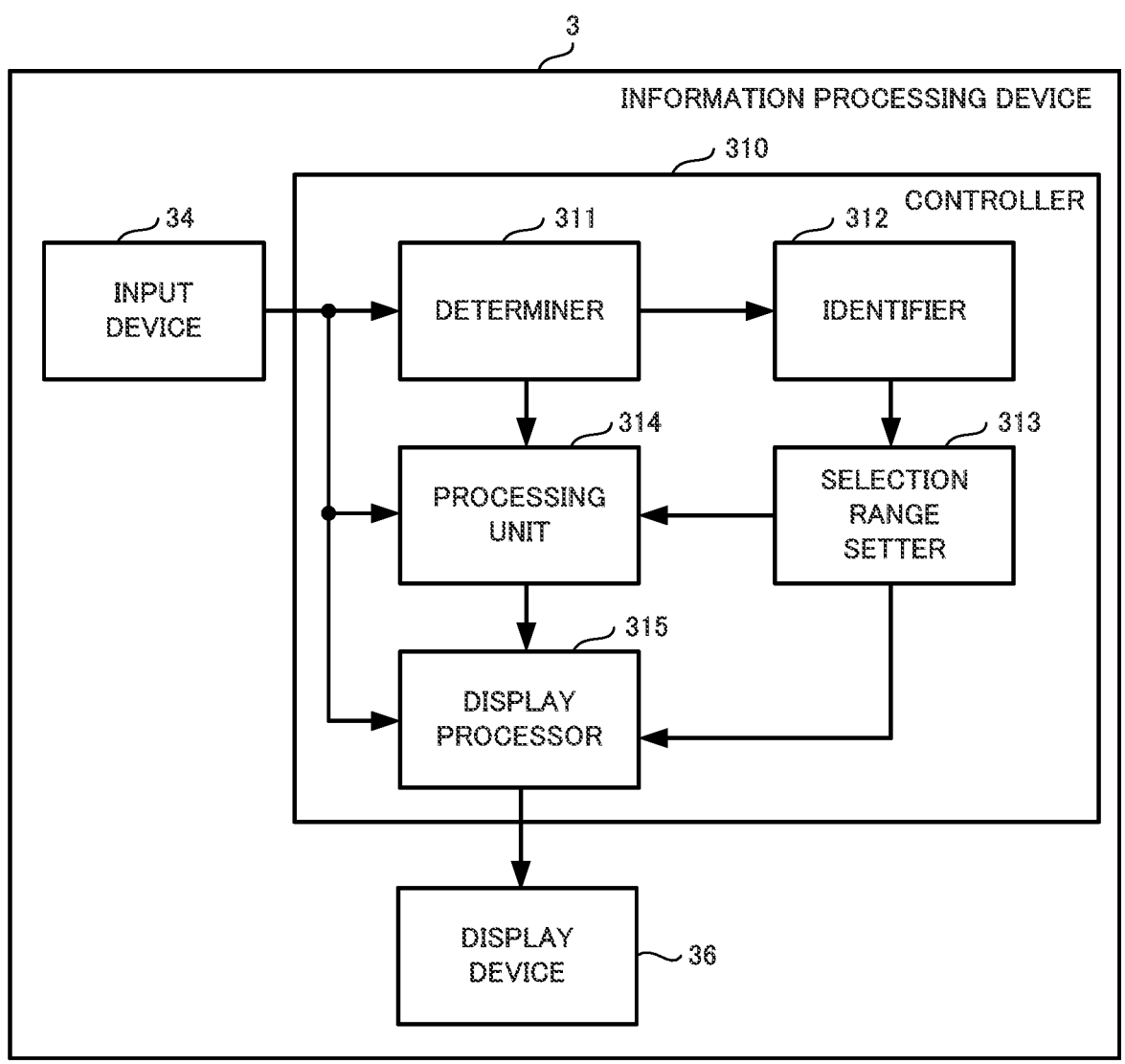
FIG. 2 is a drawing illustrating a configuration of a controller of the information processing device according to an embodiment of the present disclosure.

A controller 310 provided with the information processing block illustrated in FIG. 2 is realized by the processor 31 executing the programs stored in the storage device 33. As a result, the information processing device 3 can determine the range of the selection in accordance with the character tapped by the user and the type of the tap on the mathematical expression displayed on the display screen, and execute various processings on the selection range.

The controller 310 includes, as the information processing block, a determiner 311, an identifier 312, a selection range setter 313, a processing unit 314, and a display processor 315. The determiner 311 determines the type of the character, among characters displayed on the screen of the display device 36, selected by the user via the input device 34, and the type of selection operation. The identifier 312 identifies, on the basis of the type of the character determined by the determiner 311, an associated character, among the characters included in the mathematical expression, that is associated with the character selected by the user. Additionally, the identifier 312 identifies, in accordance with the type of the selection operation determined by the determiner 311, the characters to be selected among the characters included in the mathematical expression.

The selection range setter 313 sets, as the selection range, the character selected by the user and the associated character identified by the identifier 312, or the characters identified by the identifier 312. The processing unit 314 executes, in accordance with a command input via the input device 34 by the user, various processings on the selection range set by the selection range setter 313. The display processor 315 executes, in accordance with a command input via the input device 34, the selection range set by the selection range setter 313, and the various processings executed by the processing unit 314, processing for switching display content displayed on the display device 36.

Figure 3:
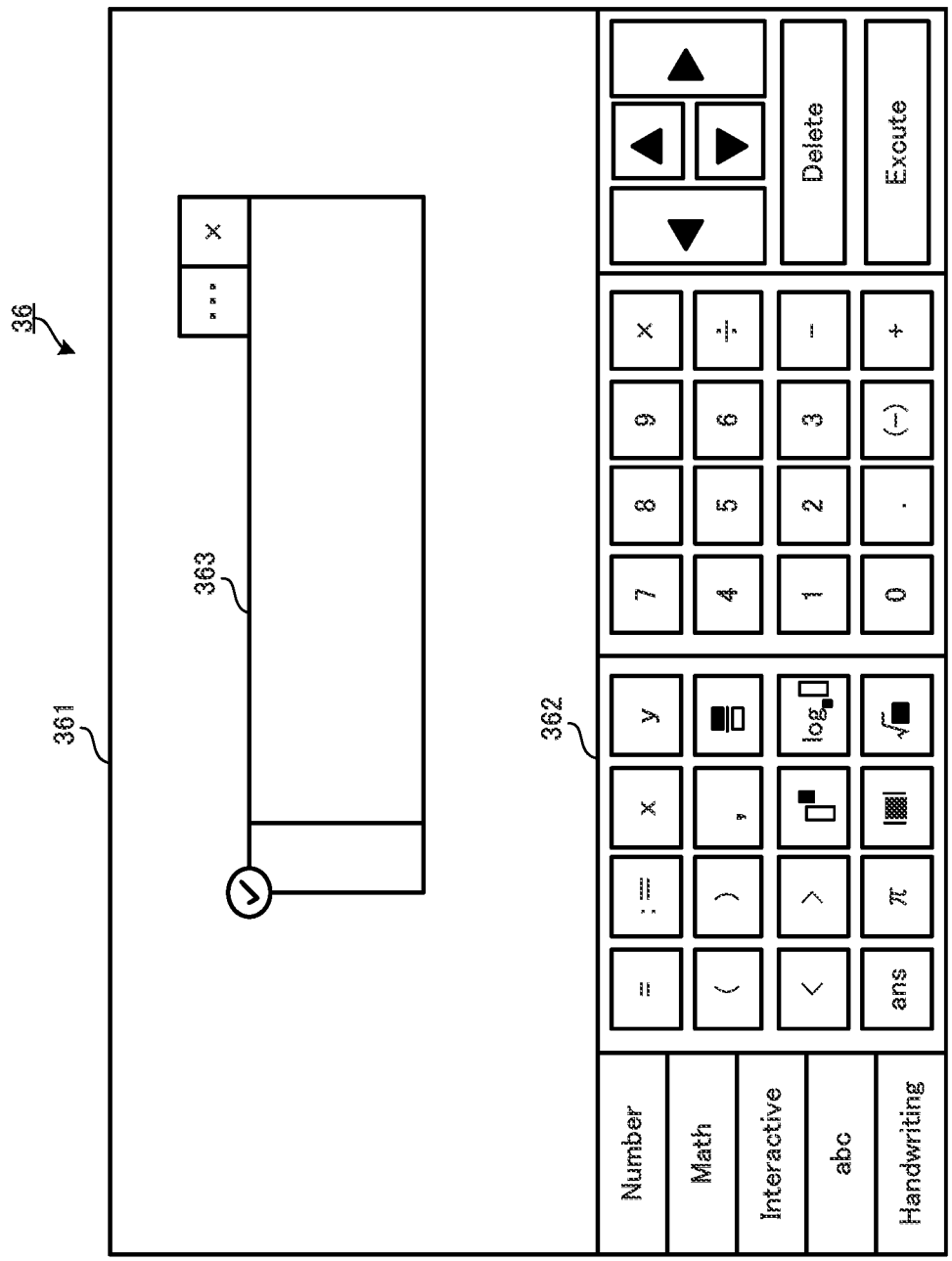
FIG. 3 is a drawing illustrating an example of a screen display of a display device of the information processing device according to an embodiment of the present disclosure.

The information processing device 3 displays, in accordance with a command from the user via the input device 34, an input screen for inputting a mathematical expression on the screen of the display device 36. The input screen for inputting the mathematical expression can, for example, by displayed by a web browser running on the screen of the display device 36. FIG. 3 illustrates an example of the input screen for inputting the mathematical expression.

The input screen for inputting the mathematical expression includes a data display section 361, a data input section 362, and a mathematical expression input section 363. The data display section 361 is a display section for displaying various data. For example, the data display section 361 displays the computation results computed by the server 1 on the basis of the computation command received from the information processing device 3.

The data input section 362 is an input section where numerals, operators, arrow keys, and other various mathematical expressions and computation commands can be input. The mathematical expression input section 363 is an input section where mathematical expressions can be input. Not only one, but a plurality of mathematical expression input sections 363 can be displayed simultaneously.

The user can perform settings, changes, additions, and the like of the values of the parameters included in the mathematical expressions input in the mathematical expression input section 363. Additionally, the user can select, as desired, a portion or an entirety of the mathematical expression input in the mathematical expression input section 363, and copy this selection to another mathematical expression input section 363. In this case, when the user performs a selection operation on the screen of the display device 36 by tapping a character included in the mathematical expression input in the mathematical expression input section 363, the determiner 311 illustrated in FIG. 2 determines the type of the tapped character. Then, the identifier 312 illustrated in FIG. 2 identifies, on the basis of the determined type of the character, an associated character associated with the tapped character.

The selection range setter 313 illustrated in FIG. 2 selects an appropriate range in the mathematical expression on the basis of the tapped character and the associated character. The display processor 315 illustrated in FIG. 2 displays the selected range (hereinafter referred to as "selection range") on the screen of the display device 36. In the following, a selection method of the selection range is described while referencing FIGS. 4 to 11. In the following description, the term "tap" means a single tap when not specified as "double tap."

Figure 4:
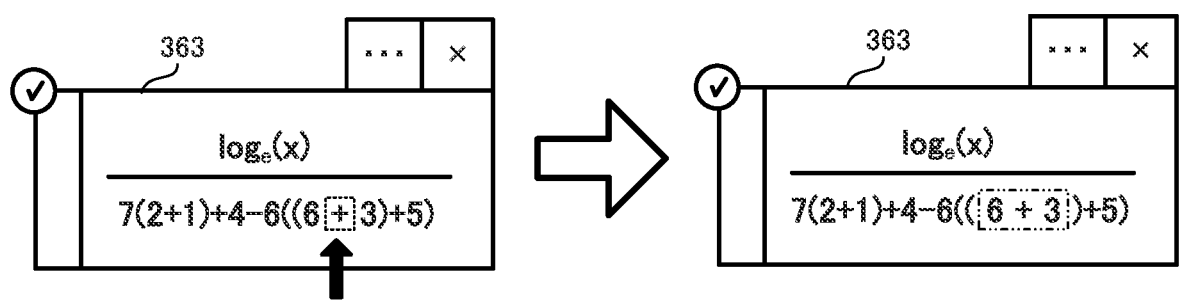
FIG. 4 is a drawing illustrating an example of a method for selecting a desired range in a mathematical expression according to an embodiment of the present disclosure.

In FIG. 4, when the user taps, on the screen of the display device 36 using the input device 34 illustrated in FIG. 1, an operator included in the mathematical expression input in the mathematical expression input section 363, in accordance with that tap, the smallest mathematical expression that includes an operand of the tapped operator is selected by the selection range setter 313 illustrated in FIG. 2. In the following, the black arrow is an arrow indicating the tap position. Additionally, the range surrounded by dashed lines is the range tapped by the user. The selection range selected by the selection range setter 313 is displayed with the color of the selected character and the color of the background of the selected character inverted. However, here, for the sake of convenience, the selection range is illustrated surrounded by the double-dotted lines. For example, as illustrated in FIG. 4, when the determiner 311 illustrated in FIG. 2 determines that the operator "+" is tapped, the identifier 312 identifies "6" and "3" that are operands of the operator "+" as associated characters. The selection range setter 313 selects, as the selection range, the smallest mathematical expression including the selected operator and the associated characters, that is, selects "6+3". The selection range is surrounded by double-dotted lines by the display processor 315 illustrated in FIG. 2, and is displayed on the screen of the display device 36.

The mathematical expressions illustrated in FIGS. 5A to 5D include special operators such as integrals, derivatives, and the like. In such cases, when the user taps, on the screen of the display device 36 using the input device 34 illustrated in FIG. 1, a special operator included in the mathematical expression input in the mathematical expression input section 363, in accordance with that tap, the tapped special operator and parameters accompanying that special operator are selected.

Figure 5A:
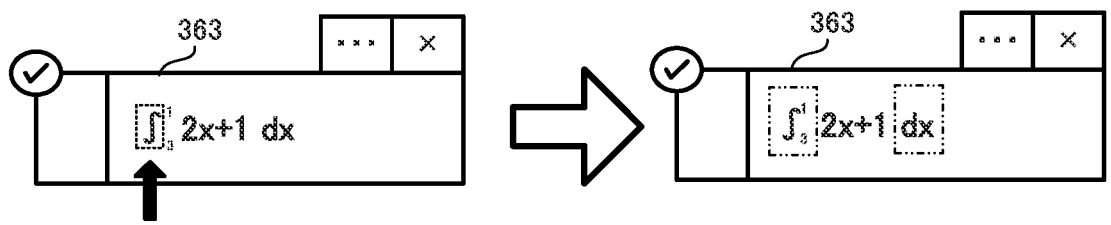
FIG. 5A is a drawing illustrating an example of a change of a selection range in a case in which a special operator of a mathematical expression is tapped, according to an embodiment of the present disclosure.
Figure 5B:
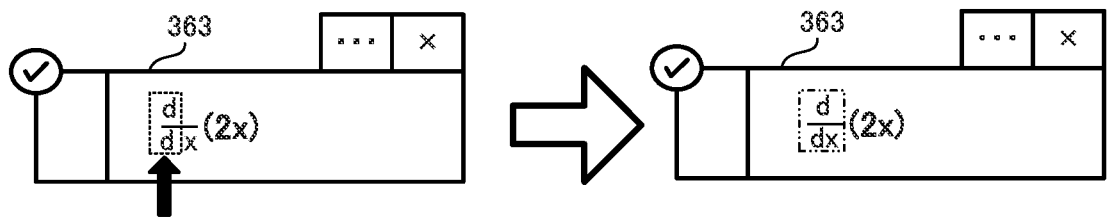
FIG. 5B is a drawing illustrating an example of a change of a selection range in a case in which a special operator of a mathematical expression is tapped, according to an embodiment of the present disclosure.

For example, as illustrated in FIG. 5A, when the integral symbol "∫" that is a special operator is tapped, "1" and "3", which are interval settings and "dx", which are parameters accompanying the integral symbol "∫", are selected. Additionally, as illustrated in FIG. 5B, when the derivative symbol "d/d" that is a special operator is tapped, "x", which is a parameter accompanying the derivative symbol "d/d", is selected.

Figure 5C:
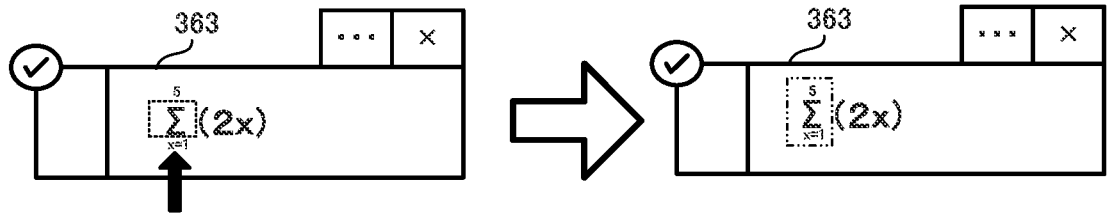
FIG. 5C is a drawing illustrating an example of a change of a selection range in a case in which a special operator of a mathematical expression is tapped, according to an embodiment of the present disclosure.
Figure 5D:
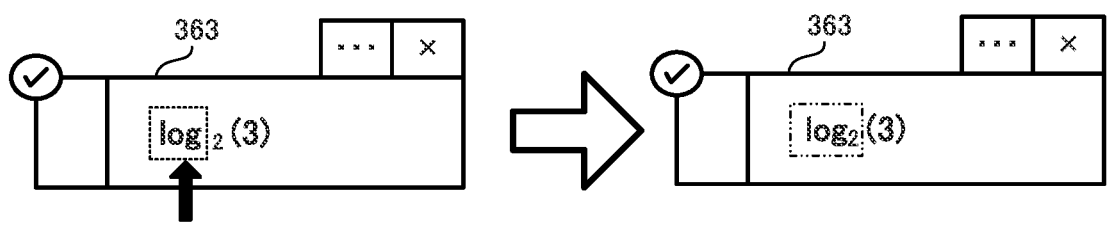
FIG. 5D is a drawing illustrating an example of a change of a selection range in a case in which a special operator of a mathematical expression is tapped, according to an embodiment of the present disclosure.

As illustrated in FIG. 5C, when the symbol "Σ" that is a special operator is tapped, "x=1" and "5", which are parameters accompanying the symbol "Σ", are selected. As illustrated in FIG. 5D, when the logarithm symbol "log" that is a special operator is tapped, "2", which is a parameter accompanying the logarithm symbol "log", is selected.

FIGS. 6A to 6D respectively illustrate the selection ranges in cases in which the selection ranges selected in FIGS. 5A to 5D are tapped again on the screen of the display device 36. Specifically, the user taps the selection ranges selected in FIGS. 5A to 5D, on the screen of the display device 36 using the input device 34 illustrated in FIG. 1. In accordance with this tap, the smallest mathematical expression is selected that includes the special operator and the accompanying parameters included in the tapped selection range, and an operand of the special operator, thereby expanding the selection range.

Figure 6A:
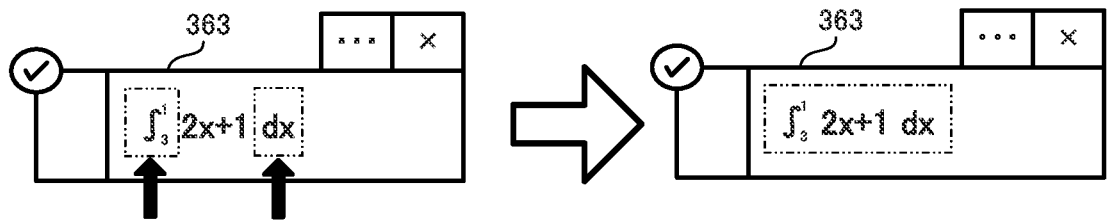
FIG. 6A is a drawing illustrating an example in which, in a case in which the selection range selected in FIG. 5A is tapped, in addition to the special operator and accompanying parameters, an operand is also included in the selection range.
Figure 6B:
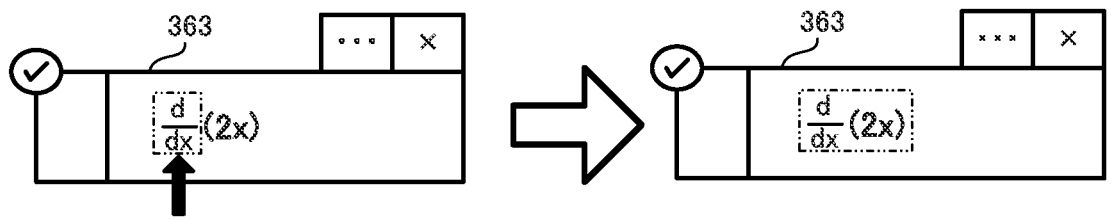
FIG. 6B is a drawing illustrating an example in which, in a case in which the selection range selected in FIG. 5B is tapped, in addition to the special operator and an accompanying parameter, an operand is also included in the selection range.

For example, as illustrated in FIG. 6A, the interval settings "1" and "3" and "dx", which are parameters accompanying the integral symbol "∫" that is a special operator, are selected. In this case, when the selection range that is already selected is tapped again, "2x+1", which is an operand of the integral symbol "∫", is also selected. Specifically, when one or both of the integral symbol "∫" and the interval settings "1" and "3", and "dx" is tapped, "2x+1", which is an operand of the integral symbol "∫", is also selected. Additionally, as illustrated in FIG. 6B, the derivative symbol "d/d" that is a special operator, and "x", which is an accompanying parameter, are selected. In this case, when the selection range that is already selected is tapped again, "2x", which is an operand of the derivative symbol "d/d", is also selected.

Figure 6C:
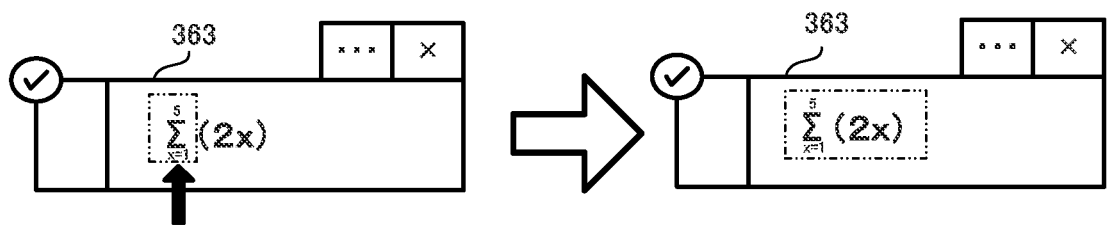
FIG. 6C is a drawing illustrating an example in which, in a case in which the selection range selected in FIG. 5C is tapped, in addition to the special operator and accompanying parameters, an operand is also included in the selection range.
Figure 6D:
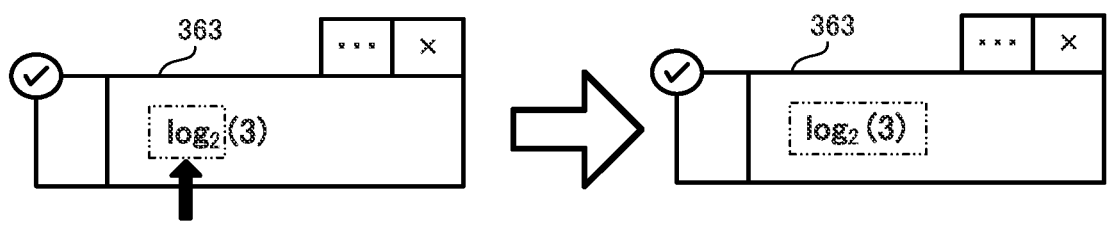
FIG. 6D is a drawing illustrating an example in which, in a case in which the selection range selected in FIG. 5D is tapped, in addition to the special operator and accompanying parameter, an operand is also included in the selection range.

As illustrated in FIG. 6C, "x=1" and "5", which are parameters accompanying the symbol "Σ" that is a special operator, are selected. In this case, when the selection range that is already selected is tapped again, "(2x)", which is an operand of the symbol "Σ", is also selected. Additionally, as illustrated in FIG. 6D, "2", which is a parameter accompanying the logarithm symbol "log" that is a special operator, is selected. In this case, when the selection range that is already selected is tapped again, "3", which is an operand of the logarithm symbol "log", is also selected.

Figure 7A:
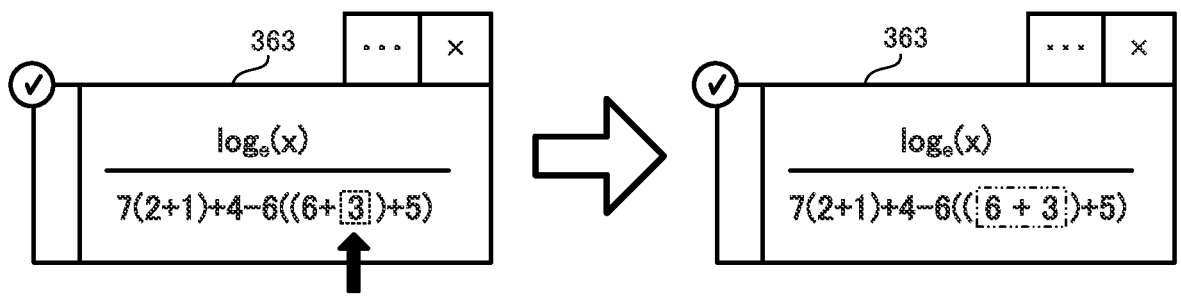
FIG. 7A is a drawing illustrating an example of a change of a selection range in a case in which an operand of a mathematical expression is tapped, according to an embodiment of the present disclosure.
Figure 7B:
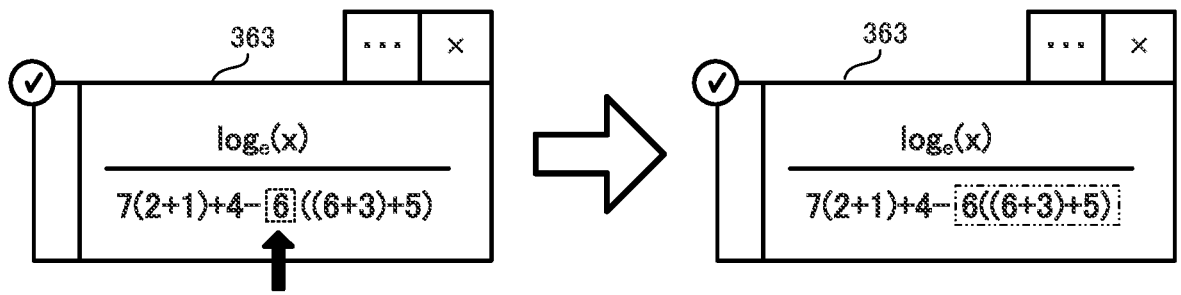
FIG. 7B is a drawing illustrating an example of a change of a selection range in a case in which an operand of a mathematical expression is tapped, according to an embodiment of the present disclosure.
Figure 7C:
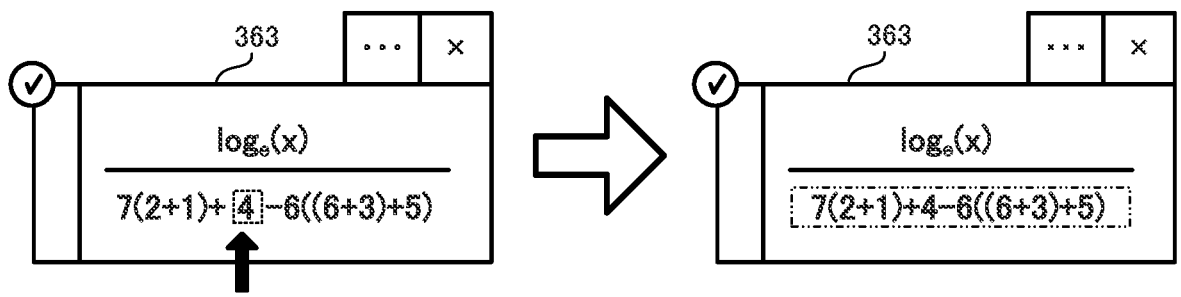
FIG. 7C is a drawing illustrating an example of a change of a selection range in a case in which an operand of a mathematical expression is tapped, according to an embodiment of the present disclosure.

The mathematical expression illustrated in FIGS. 7A to 7C includes a plurality of operators and operands. In such a case, when the user taps, on the screen of the display device 36 using the input device 34 illustrated in FIG. 1, an operand included in the mathematical expression input in the mathematical expression input section 363, in accordance with that tap, the range to be selected changes in accordance with the number of operators targeting the operand and the order of operations of the operators.

Firstly, when there is one operator targeting the operand tapped on the screen of the display device 36, the smallest mathematical expression including the tapped operand, the operator targeting the operand, and operands, other than the tapped operand, that this operator targets are selected. For example, as illustrated in FIG. 7A, when the operand "3" is tapped, "6+3", which is the smallest mathematical expression including the operator "+" that targets the operand "3", is selected.

Next, when there are two operators that target the tapped operand and, also, the order of operations of these operators differ from each other, the smallest mathematical expression including the tapped operand and the operator with higher operational precedence is selected. For example, as illustrated in FIG. 7B, the operand "6" is tapped. In this case, the operators that target the operand "6" are "−" and "*", which is omitted due to the parentheses. The order of operations of "*" is higher than the order of operations of "−". As such, "6((6+3)+5)" is selected as the smallest mathematical expression including the operand "6" and the operator "*" that has the higher order of operations.

When there are two operators that target the tapped operand and, also, the order of operations of these operators is substantially equal, the smallest mathematical expression including the tapped operand and both of these operators is selected. For example, as illustrated in FIG. 7C, when the operand "4" is tapped, the operators that target the operand "4" are "−" and "+". The order of operations of these "−" and "+" is the same. As such, "7(2+1)+4−6((6+3)+5)" is selected as the smallest mathematical expression including the operand "4" and the operators "−" and "+".

Figure 8A:
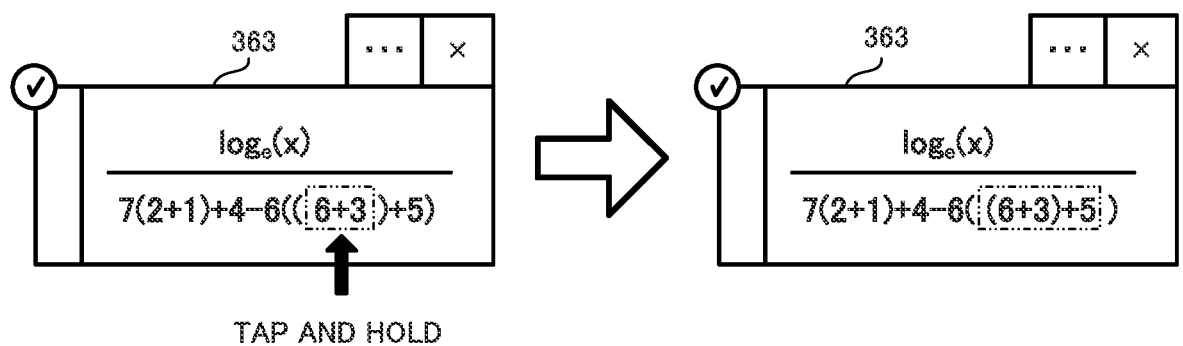
FIG. 8A is a drawing illustrating an example of a change of a selection range in a case in which an operand of a mathematical expression is tapped and held, according to an embodiment of the present disclosure.
Figure 8B:
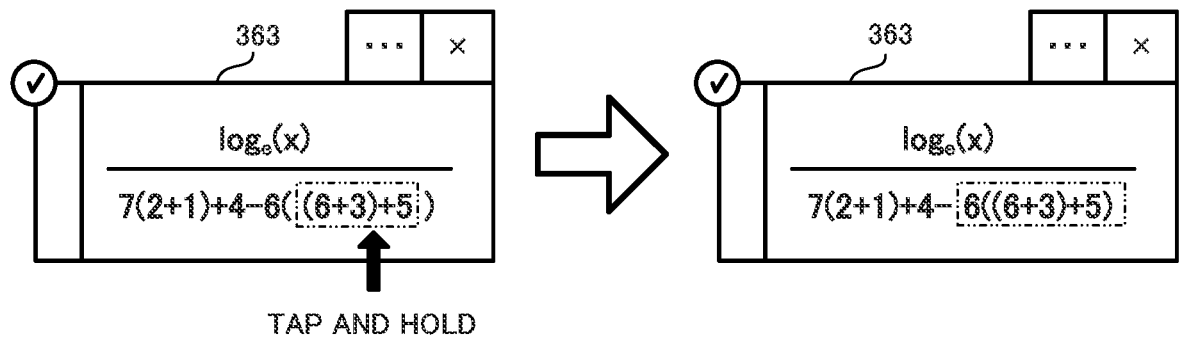
FIG. 8B is a drawing illustrating an example of a change of a selection range in a case in which an operand of a mathematical expression is tapped and held, according to an embodiment of the present disclosure.

The mathematical expression illustrated in FIGS. 8A and 8B includes a plurality of operators and operands. In such a case, when the user taps and holds, on the screen of the display device 36 using the input device 34 illustrated in FIG. 1, an operand included in the mathematical expression input in the mathematical expression input section 363 and the selection range that is already selected, the selection range can be gradually expanded in accordance with that tap and hold.

For example, as illustrated in FIG. 8A, when "6+3", which is selected, is tapped and held, the selection range is expanded to the mathematical expression including the operator "+", which targets "6+3", and "5", which is an operand other than "6+3" that this operator targets. That is, the selection range is expanded to "(6+3)+5". For example, as illustrated in FIG. 8B, when "(6+3)+5", which is selected, is tapped and held, the selection range is expanded to the mathematical expression including the operator "*", which is omitted due to the parentheses and that targets "(6+3)+5", and "6", which is an operand other than "(6+3)+5 that this operator targets. That is, the selection range is expanded to "6(6+3)+5".

The mathematical expression illustrated in FIGS. 9A to 9F includes a plurality of operators and operands, the same as in the mathematical expression illustrated in FIGS. 8A and 8B. In such a case, it is assumed that the user taps and holds, on the screen of the display device 36 by the input device 34 illustrated in FIG. 1, an operand included in the mathematical expression input by the user. In this case, the selection range can be gradually expanded in accordance with an amount of time the operand is tapped and held.

Figure 9A:
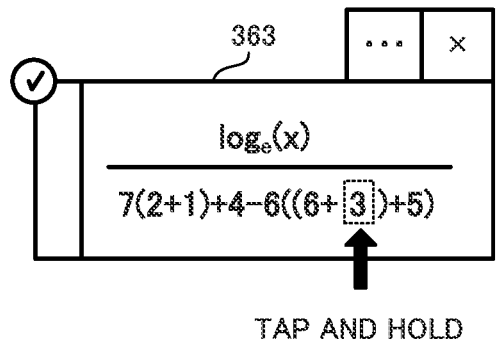
FIG. 9A is a drawing illustrating an example of a change of a selection range in a case in which an operand of a mathematical expression is tapped and held, according to an embodiment of the present disclosure.
Figure 9B:
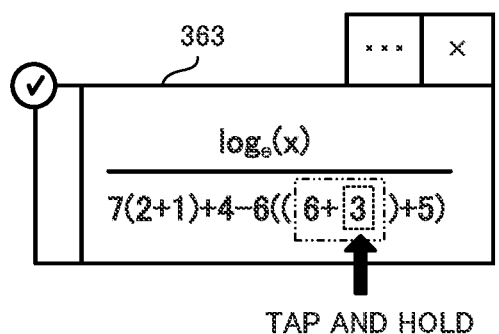
FIG. 9B is a drawing illustrating an example of a change of a selection range in a case in which the operand that is tapped and held in FIG. 9A is further tapped and held.
Figure 9C:
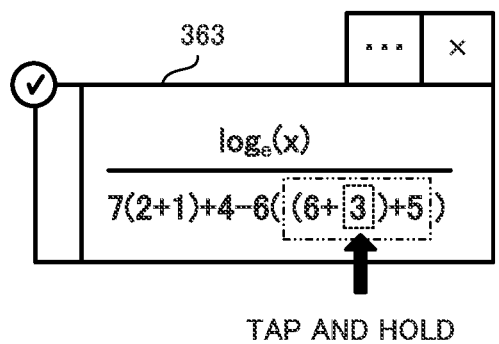
FIG. 9C is a drawing illustrating an example of a change of a selection range in a case in which the operand that is tapped and held in FIG. 9B is further tapped and held.

For example, as illustrated in FIG. 9A, "3", which is an operand in the mathematical expression, is tapped and held. In this case, as illustrated in FIG. 9B, the selection range is expanded to a mathematical expression including the operator "+" that targets "3", and "6", which is an operand that this operator targets. That is, the selection range is expanded to "6+3". Moreover, it is assumed that the user further taps and holds the operand "3". In this case, as illustrated in FIG. 9C, the selection range is expanded to a mathematical expression including the operator "+" that targets "6+3", and "5", which is an operand other than "6+3" that this operator targets. That is, the selection range is expanded to "(6+3)+5".

Figure 9D:
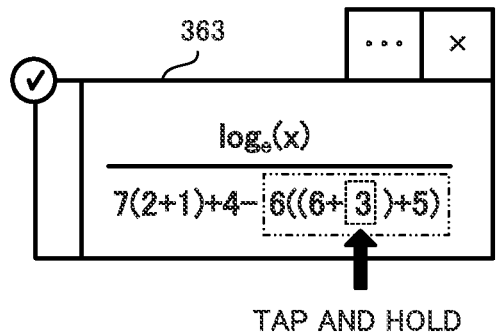
FIG. 9D is a drawing illustrating an example of a change of a selection range in a case in which the operand that is tapped and held in FIG. 9C is further tapped and held.

In this state, it is assumed that the user further taps and holds the operand "3". In this case, as illustrated in FIG. 9D, the selection range is expanded to a mathematical expression including the operator "*", which is omitted due to the parentheses, and "6", which is an operand other than "(6+3)+5 that this operator targets. That is, the selection range is expanded to "6(6+3)+5".

Figure 9E:
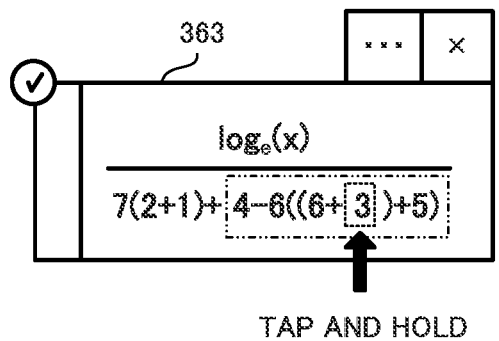
FIG. 9E is a drawing illustrating a change of a selection range in a case in which the operand that is tapped and held in FIG. 9D is further tapped and held.

Then, it is assumed that the user further taps and holds the operand "3". In this case, as illustrated in FIG. 9E, the selection range is expanded to a mathematical expression including the operator "−" that targets "6(6+3)+5", and "4", which is an operand other than "6(6+3)+5" that this operator targets. That is, the selection range is expanded to "4−6(6+3)+5".

Figure 9F:
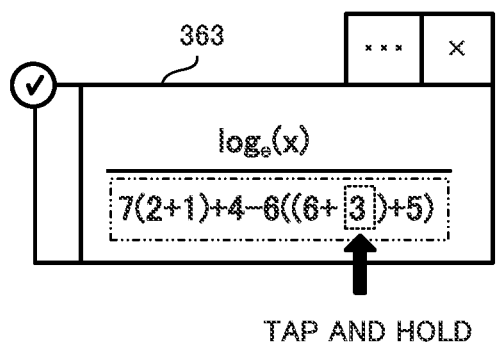
FIG. 9F is a drawing illustrating an example of a change of a selection range in a case in which the operand that is tapped and held in FIG. 9E is further tapped and held.

Furthermore, it is assumed that the user further taps and holds the operand "3". In this case, as illustrated in FIG. 9F, the selection range is expanded to a mathematical expression including the operator "+" that targets "4−6(6+3)+5", and "7(2+1)", which is an operand other than "4−6(6+3)+5" that this operator targets. That is, the selection range is expanded to "7(2+1)+4−6(6+3)+5".

The mathematical expressions illustrated in FIGS. 10A to 10D include special operators such as integrals, derivatives, and the like. In such cases, the user taps, on the screen of the display device 36 using the input device 34 illustrated in FIG. 1, an operand included in the mathematical expression input in the mathematical expression input section 363. In accordance with this tap, the tapped operand, and the special operator that targets the operand and accompanying parameters are selected.

Figure 10A:
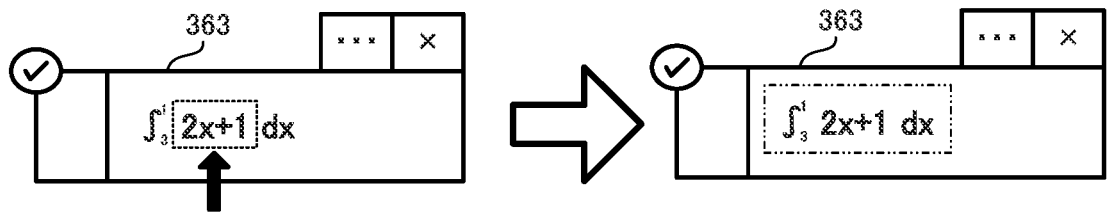
FIG. 10A is a drawing illustrating an example of a change of a selection range in a case in which an operand selected in a mathematical expression is tapped, according to an embodiment of the present disclosure.
Figure 10B:
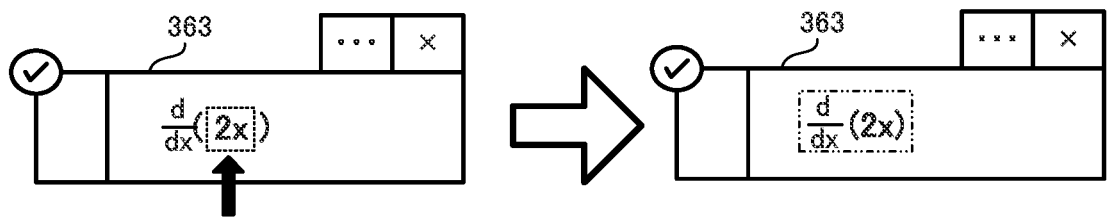
FIG. 10B is a drawing illustrating an example of a change of a selection range in a case in which an operand selected in a mathematical expression is tapped, according to an embodiment of the present disclosure.

For example, as illustrated in FIG. 10A, when "2x+1", which is an operand, is tapped, "2x+1", which is the operand, the integral symbol "∫", which is a special operator that targets the operand, and the interval settings "1" and "3" and "dx", which are parameters accompanying the integral symbol "∫", are selected. Additionally, for example, as illustrated in FIG. 10B, when "2x", which is an operand, is tapped, the operand "2x", the derivative symbol "d/d", which is a special operator that targets the operand, and "x", which is a parameter accompanying the derivative symbol "d/d", are selected.

Figure 10C:
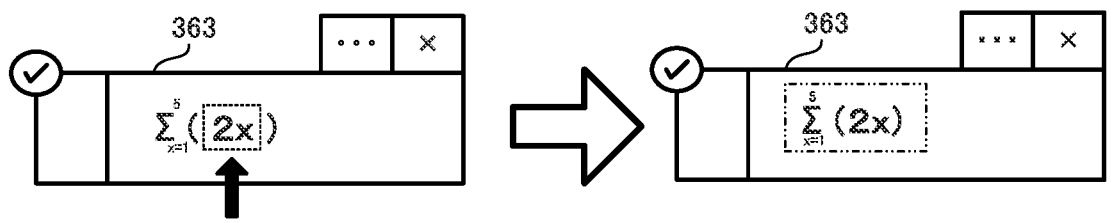
FIG. 10C is a drawing illustrating an example of a change of a selection range in a case in which an operand selected in a mathematical expression is tapped, according to an embodiment of the present disclosure.
Figure 10D:
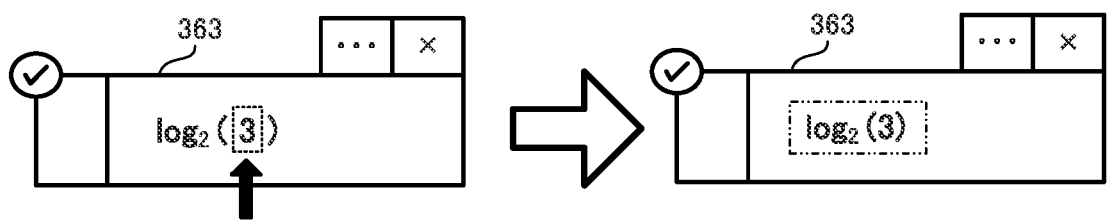
FIG. 10D is a drawing illustrating an example of a change of a selection range in a case in which an operand selected in a mathematical expression is tapped, according to an embodiment of the present disclosure.

For example, as illustrated in FIG. 10C, when "2x", which is an operand, is tapped, the operand "2x", the symbol "X", which is a special operator that targets the operand, and "x=1" and "5", which are parameters accompanying the symbol "Σ", are selected. Additionally, for example, as illustrated in FIG. 10D, when "3", which is an operand, is tapped, the operand "3", the logarithm symbol "log", which is a special operator that targets the operand, and "2", which is a parameter accompanying the logarithm symbol "log", are selected.

Figure 11A:
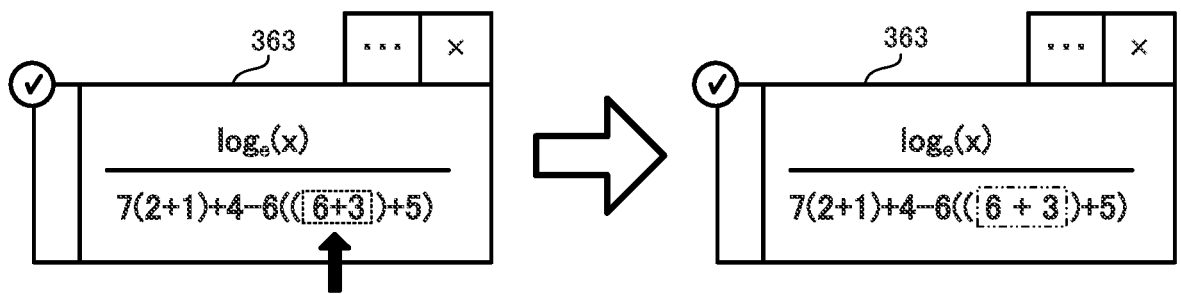
FIG. 11A is a drawing illustrating an example of a change of a selection range in a case in which a mathematical expression in parentheses in a mathematical expression is double-tapped, according to an embodiment of the present disclosure.
Figure 11B:
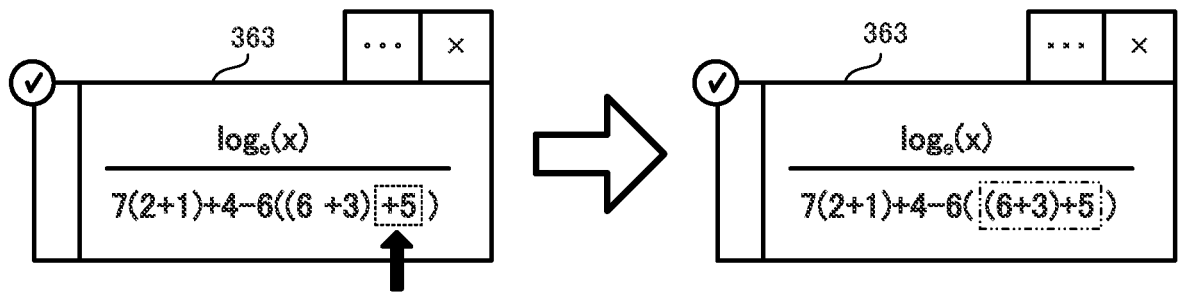
FIG. 11B is a drawing illustrating an example of a change of a selection range in a case in which a mathematical expression in parentheses in a mathematical expression is double-tapped, according to an embodiment of the present disclosure.
Figure 11C:
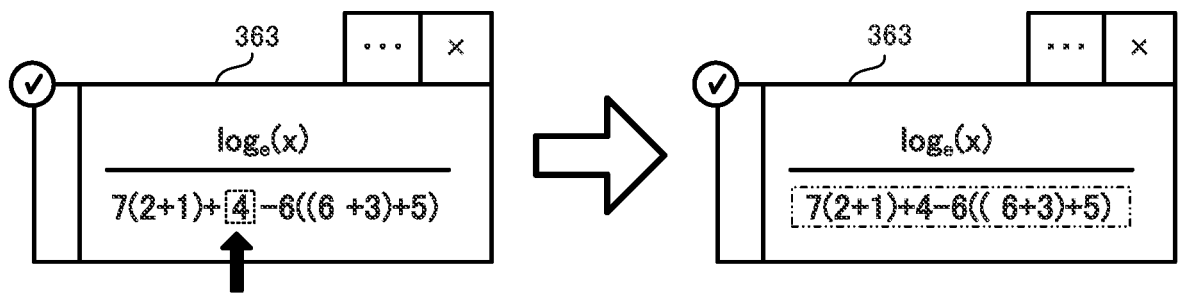
FIG. 11C is a drawing illustrating an example of a change of a selection range in a case in which a mathematical expression in parentheses in a mathematical expression is double-tapped, according to an embodiment of the present disclosure.

Additionally, when, for example, the user double taps, on the screen of the display device 36 illustrated in FIG. 1, an operator in parentheses and/or an operand in parentheses in the mathematical expressions illustrated in FIGS. 11A to 11C, the smallest mathematical expression in parentheses including the double tapped operator in parentheses and/or operand in parentheses is selected. As illustrated in FIG. 11A, when the operator "+" and "6" and "3", which are two operands that the operator targets, are simultaneously double tapped, the smallest mathematical expression in parentheses including the double tapped operator or operand is "6+3". As such, "6+3" is selected.

As illustrated in FIG. 11B, when the operator "+" in parentheses and the operand "5" in parentheses that this operator targets are simultaneously double tapped, the smallest mathematical expression in parentheses including the double tapped operator "+" and operand "5" is "(6+3)+ 5". As such, "(6+3)+5" is selected.

Additionally, for example, as illustrated in FIG. 11C, when "4", which is an operand in the mathematical expression of the denominator is double tapped, the entire denominator is "(7(2+1)+4−6((6+3)+5))", a mathematical expression included in one set of parentheses. As such, the entire denominator is selected as the smallest mathematical expression in parentheses including the operand "4". Note that, when the operator "/" is double tapped, the entire mathematical expression including the denominator and the numerator is selected as a mathematical expression included in one set of parentheses.

Figure 12A:
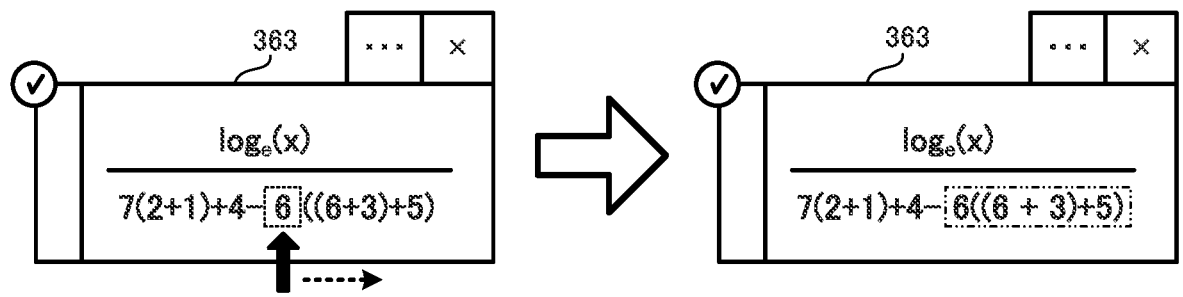
FIG. 12A is a drawing illustrating an example of a change of a selection range in a case in which a draw operation is performed in a mathematical expression according to an embodiment of the present disclosure.
Figure 12B:
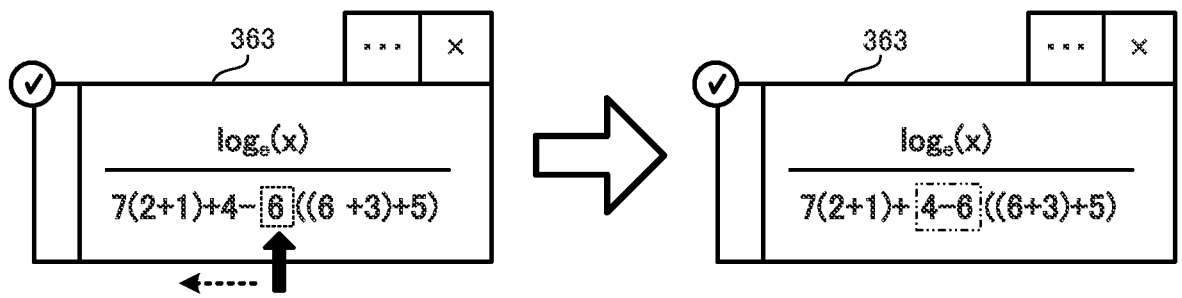
FIG. 12B is a drawing illustrating an example of a change of a selection range in a case in which a draw operation is performed in a mathematical expression according to an embodiment of the present disclosure.
Figure 12C:
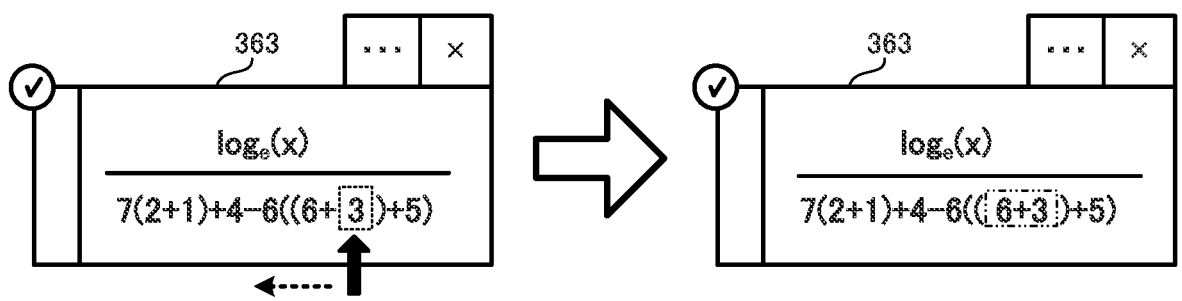
FIG. 12C is a drawing illustrating an example of a change of a selection range in a case in which a draw operation is performed in a mathematical expression according to an embodiment of the present disclosure.

In the mathematical expression illustrated in FIGS. 12A to 12C, when an operator and/or an operand is tapped and, then, a draw operation is performed in an arrangement direction of the numbers of the mathematical expression, the tapped operator and/or operand and the smallest mathematical expression including operators and the operands located in the direction of the draw operation are selected. Additionally, when there are parentheses to the left and right of the tapped operator and/or operand, the smallest mathematical expression included in the parentheses, located in the direction in which the draw operation is performed, is selected.

For example, as illustrated in FIG. 12A, when "6", which is an operand, is tapped, and then a draw operation is performed in the direction of the dashed arrow, the operator in the direction of the dashed arrow of the tapped operand "6" is "*", which is omitted due to the parentheses, and the operand other than "6" that this operator targets is "((6+3)+ 5)". As such, "6((6+3)+5)" is selected.

For example, as illustrated in FIG. 12B, when "6", which is an operand, is tapped, and then a draw operation is performed in the direction of the dashed arrow, the operator in the direction of the dashed arrow of the tapped operand "6" is "−", and the operand is "4". As such, "4−6" is selected as the smallest mathematical expression.

Additionally, for example, as illustrated in FIG. 12C, when "3", which is an operand, is tapped and, then, a draw operation is performed in the direction of the dashed arrow, the operator in the direction of the dashed arrow of the tapped operand "3" is "+", and the operand is "6". As such, "6+3" is selected as the smallest mathematical expression. Note that, when "3", which is an operand, is tapped and, then, a draw operation is performed in the direction opposite to the direction of the dashed arrow, ")", the operator "+", and the operand "5" are located in the direction in which the draw operation is performed. The "("that forms a pair with the")" is the "(" at a position on the other side of the operator "+" and the operand "6" from the tapped operand "3". As such, the ")" that is in the direction in which the draw operation is performed, the "("that forms a pair with the")", "6+3" that is included in these parentheses, and the operator "+" and the operand "5" located in the direction in which the draw operation is performed are selected as the smallest mathematical expression. That is, "(6+3)+5" is selected as the smallest mathematical expression.

FIGS. 13A to 13D illustrate examples of changes in the selection range in cases in which a shrinking operation, in which the selection range in an already selected state is shrunk in accordance with a selection operation performed by the user, is carried out. In the mathematical expression illustrated in FIGS. 13A to 13D, when one end of the selection range that is in the already selected state is double tapped, the operand located at the end of the side opposite the double tapped end, or the smallest mathematical expression including both the operand and the operator is selected. As a result, the selection range is shrunk. Additionally, when the selection range includes an operand and an operator that are surrounded by parentheses, the operand immediately outside the parenthesis located at the end of the side opposite the double tapped end, or the smallest mathematical expression surrounded by the parentheses is selected. As a result, the selection range is shrunk.

Figure 13A:
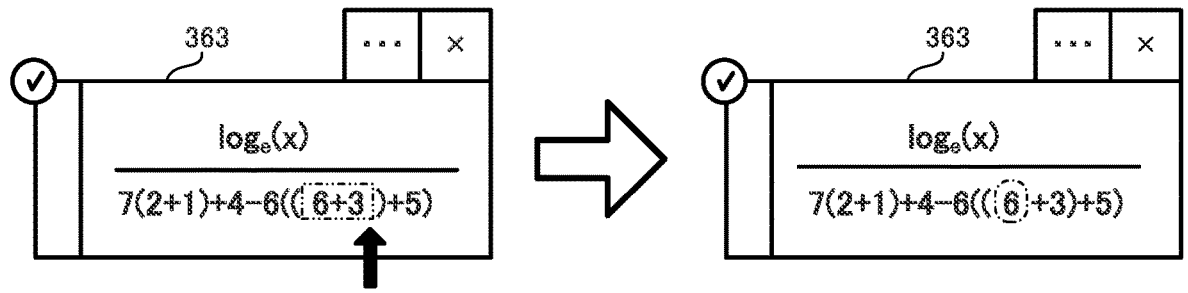
FIG. 13A is a drawing illustrating an example of a change of a selection range in a case in which one end of a selection range is double-tapped in a mathematical expression according to an embodiment of the present disclosure.
Figure 13B:
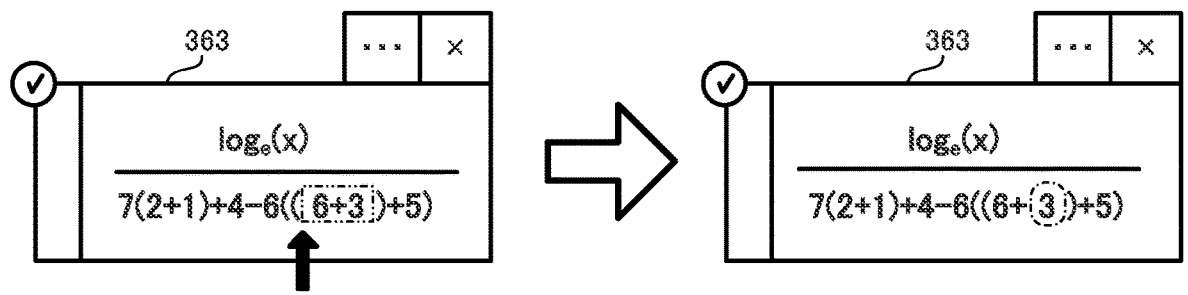
FIG. 13B is a drawing illustrating an example of a change of a selection range in a case in which one end of a selection range is double-tapped in a mathematical expression according to an embodiment of the present disclosure.

For example, as illustrated in FIG. 13A, in a case in which "6+3" is selected (the range surrounded by the double-dotted lines illustrated on the left side of FIG. 13A), when the end of the selection range on the "3" side is double tapped, the operand located at the end of the side opposite the double tapped end, namely "6", is selected (the range surrounded by the double-dotted lines illustrated on the right side of FIG. 13A). Additionally, for example, as illustrated in FIG. 13B, in a case in which "6+3" is selected (the range surrounded by the double-dotted lines illustrated on the left side of FIG. 13B), when the end of the selection range on the "6" side is double tapped, the operand located at the end of the side opposite the double tapped end, namely "3", is selected (the range surrounded by the single-dotted lines illustrated on the right side of FIG. 13B).

Figure 13C:
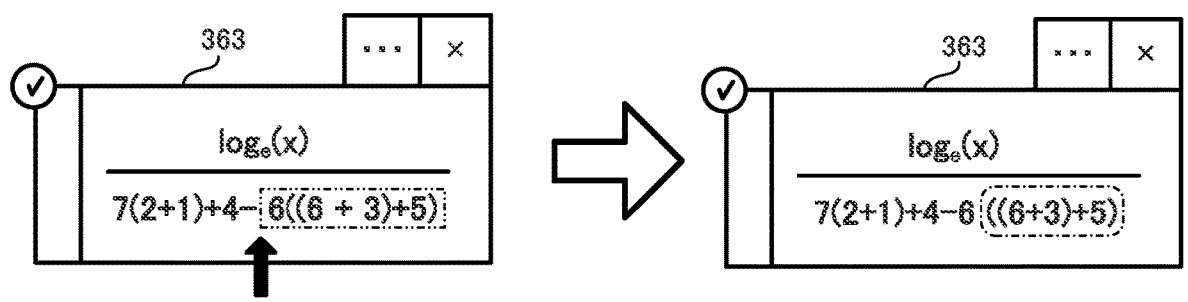
FIG. 13C is a drawing illustrating an example of a change of a selection range in a case in which one end of a selection range is double-tapped in a mathematical expression according to an embodiment of the present disclosure.

As illustrated in FIG. 13C, it is assumed that, in a case in which "6((6+3)+5)" is selected (the range surrounded by the double-dotted lines illustrated on the left side of FIG. 13C), the end of the selection range on the "6" side, which is outside the parentheses, of "6((6+3)+5)", is double tapped. "6((6+3)+5))" can be expressed as "6*((6+3)+5)" using the operator "*" that is omitted due to the parentheses. As such, the smallest mathematical expression surrounded by the parentheses at the end of the side opposite the double tapped end, namely "((6+3)+5)" that is located across "*" and at the end of the side opposite "6", which is at the double tapped end side, is selected (the range surrounded by the single-dotted lines illustrated on the right side of FIG. 13C).

Figure 13D:
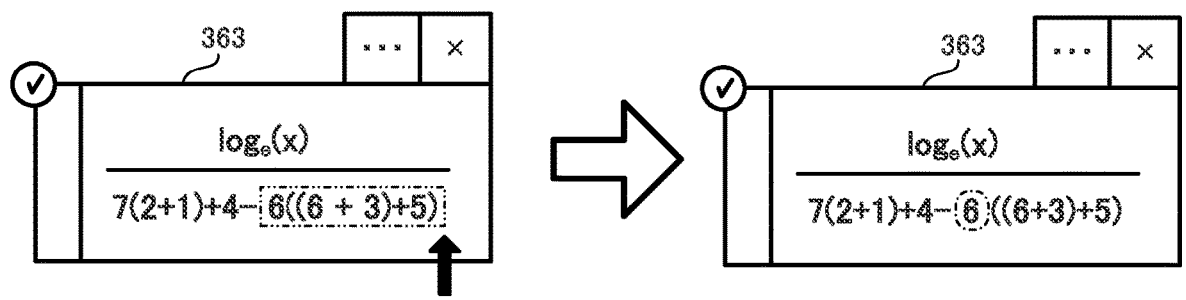
FIG. 13D is a drawing illustrating an example of a change of a selection range in a case in which one end of a selection range is double-tapped in a mathematical expression according to an embodiment of the present disclosure.

As illustrated in FIG. 13D, it is assumed that, in a case in which "6((6+3)+5)" is selected (the range surrounded by the double-dotted lines illustrated on the left side of FIG. 13D), the end of the selection range on the ")" side, which is the side opposite "6", of "6((6+3)+5)", is double tapped. "6((6+ 3)+5))" can be expressed as "6*((6+3)+5)" using the operator "*" that is omitted due to the parentheses. As such, the operand immediately outside the parenthesis at the end of the side opposite the double tapped end, namely "6" that is located across "*" and at the end of the side opposite "((6+3)+5)", which is at the double tapped end side, is selected (the range surrounded by the single-dotted lines illustrated on the right side of FIG. 13D).

Figure 14A:
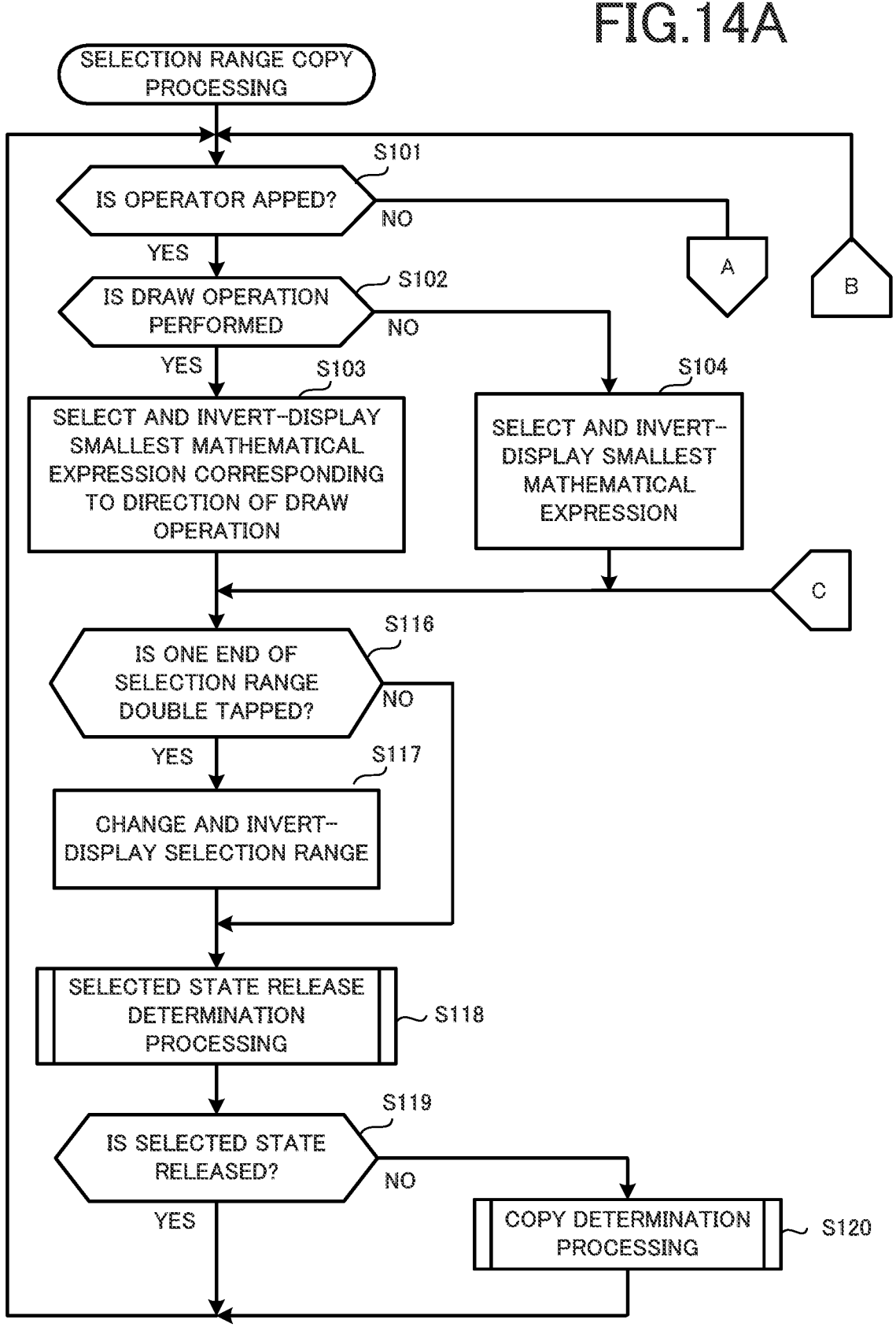
FIG. 14A is a flowchart illustrating the flow of selection range copy processing, executed in the information processing device according to an embodiment of the present disclosure.

Next, processing in which a desired range of a mathematical expression, input by the user in the mathematical expression input section 363 illustrated in FIG. 3, is selected by the selection method illustrated in FIGS. 4 to 13B and copied to another mathematical expression input section 363 is described while referencing the flowcharts of selection range copy processing illustrated in FIGS. 14A and 14B.

The selection range copy processing is stored, as a selection range copy processing program, in the storage device 33 of the information processing device 3 illustrated in FIG. 1. The information processing device 3 executes the selection range copy processing program when the mathematical expression input section 363 is displayed on the input screen for inputting a mathematical expression illustrated in FIG. 3.

Specifically, the processor 31 of the information processing device 3 illustrated in FIG. 1 reads the selection range copy processing program from the storage device 33, deploys the program to the memory 32, and executes the program.

Firstly, FIG. 14A is referenced. When a mathematical expression input in the mathematical expression input section 363 illustrated in FIG. 3 is tapped on the screen of the display device 36 by the user, the determiner 311 of the controller 310 illustrated in FIG. 2 determines whether an operator included in the mathematical expression is tapped by the user (step S101). When an operator is tapped by the user (step S101; YES), the determiner 311 of the controller 310 determines whether a draw operation is subsequently performed (step S102).

When a draw operation is performed (step S102; YES), the identifier 312 of the controller 310 illustrated in FIG. 2 identifies the smallest mathematical expression including an operator and an operand located in the direction in which the draw operation is performed, or the smallest mathematical expression included in parentheses located in the direction in which the draw operation is performed. The selection range setter 313 of the controller 310 illustrated in FIG. 2 selects the smallest mathematical expression identified by the identifier 312 as the selection range. For example, the selection range setter 313 of the controller 310 selects the smallest mathematical expression surrounded by the double-dotted lines illustrated in FIGS. 11A to 11C as the selection range. The display processor 315 displays the selected selection range in an inverted manner on the screen of the display device 36. That is, the display processor 315 inverts the color of the characters in the selection range and the color of the background in the selection range and displays the selection range (step S103). Next, the determiner 311 executes the processing illustrated in step S116. Note that the processing of step S116 is described later.

When a draw operation is not performed (step S102; NO), the identifier 312 identifies the operand of the tapped operator as an associated character. The selection range setter 313 selects the smallest mathematical expression including the tapped operator and the associated character as the selection range. For example, the selection range setter 313 selects the smallest mathematical expression surrounded by the double-dotted lines illustrated in FIG. 4 as the selection range. The display processor 315 displays the selected selection range in an inverted manner on the screen of the display device 36 (step S104). Next, the determiner 311 executes the processing illustrated in step S116.

In step S101, when an operator is not tapped by the user on the screen of the input device 34 (step S101; NO), step S105 illustrated in FIG. 14B is executed. The determiner 311 of the controller 310 determines whether a special operator is tapped by the user (step S105). When a special operator is tapped on the screen of the input device 34 by the user (step S105; YES), the identifier 312 identifies parameters accompanying the tapped special operator as the associated characters. Then, the selection range setter 313 selects the tapped special operator and the associated characters as the selection range. For example, the selection range setter 313 selects the ranges surrounded by the double-dotted lines illustrated in FIGS. 5A to 5D as the selection range. The display processor 315 displays the selected selection range in an inverted manner on the screen of the display device 36 (step S106).

Next, the determiner 311 determines whether the selection range selected in step S106 is tapped on the screen of the display device 36 by the user (step S107). When the selection range is tapped (step S107; YES), the identifier 312 identifies the operand of the special operator included in the tapped selection range as the associated character.

Next, the selection range setter 313 selects, as the selection range, the smallest mathematical expression including the special operator and the accompanying parameters included in the selection range selected in step S106 and the associated character identified by the identifier 312. For example, the selection range setter 313 selects the smallest mathematical expressions surrounded by the double-dotted lines illustrated in FIGS. 5A to 5D as the selection range. The display processor 315 illustrated in FIG. 2 displays the selected selection range in an inverted manner on the screen of the display device 36 (step S108). Next, the determiner 311 executes the processing illustrated in step S116 of FIG. 14A. When the selection range is not tapped (step S107; NO), the selection range selected in step S106 is not changed. Next, the determiner 311 executes the processing illustrated in step S116 of FIG. 14A.

In step S105, when a special operator is not tapped by the user on the screen of the display device 36 (step S105; NO), the determiner 311 determines whether an operand is tapped by the user on the screen of the input device 34 (step S109). When an operand is tapped (step S109; YES), the identifier 312 identifies the operator that targets the tapped operand as the associated character. The selection range setter 313 selects the smallest mathematical expression including the tapped operand and the associated character identified by the identifier 312 as the selection range. For example, the selection range setter 313 selects the smallest mathematical expressions surrounded by the double-dotted lines illustrated in FIGS. 7A to 7C as the selection range. The display processor 315 illustrated in FIG. 2 displays the selected selection range in an inverted manner on the screen of the display device 36 (step S110).

Then, the determiner 311 determines whether an operand included in the selection range is tapped and held by the user on the screen of the display device 36 (step S111). When an operand is tapped and held (step S111; YES), the selection range setter 313 gradually expands the selection range surrounded by the double-dotted lines as illustrated in FIGS. 7A to 7C, for example. The display processor 315 displays the gradually expanded selection range in an inverted manner on the screen of the display device 36 (step S112). When an operand is not tapped and held (step S111; NO), the selection range is not expanded. Next, the determiner 311 executes the processing illustrated in step S116 of FIG. 14A.

Then, the determiner 311 determines whether the operand included in the selection range is further tapped and held by the user on the screen of the display device 36 (step S113). When the operand is further tapped and held (step S113; YES), the selection range surrounded by the double-dotted lines is gradually expanded as illustrated in FIGS. 9A to 9F, for example. The display processor 315 displays the gradually expanded selection range in an inverted manner on the screen of the display device 36 (step S112). When the operand is not further tapped and held (step S113; NO), the selection range is not expanded. Next, the determiner 311 executes the processing illustrated in step S116 of FIG. 14A.

In step S109, when an operand is not tapped (step S109; NO), the determiner 311 determines whether an operator and/or an operand in parentheses included in the mathematical expression is double tapped by the user on the screen of the display device 36 (step S114). When an operator and/or an operand in parentheses included in the mathematical expression is double tapped (step S114; YES), the identifier 312 identifies the smallest mathematical expression in parentheses including the double tapped operator and/or operand.

The selection range setter 313 selects the smallest mathematical expression identified by the identifier 312 as the selection range. For example, the selection range setter 313 range selects the selection range surrounded by the double-dotted lines, as illustrated in FIGS. 11A to 11C. The display processor 315 illustrated in FIG. 2 displays the selected selection range in an inverted manner on the screen of the display device 36 (step S115). Then, the determiner 311 executes the processing illustrated in step S116 of FIG. 14A. When an operator and/or an operand in parentheses included in the mathematical expression is not double tapped (step S114; NO), the processing unit 314 of the controller 310 illustrated in FIG. 2 returns to step S101 illustrated in FIG. 14A.

In step S116 of FIG. 14A, the determiner 311 determines whether one end of the selection range, that is in the selected state, is double tapped. When one end of the selection range, that is in the selected state, is double tapped (step S116; YES), the identifier 312 identifies an operand located at the end of the side opposite the double tapped end, the smallest mathematical expression including both an operand and an operator, or the smallest mathematical expression surrounded by parentheses. The selection range setter 313 selects the operand, the smallest mathematical expression, or the like identified by the identifier 312 as the selection range. For example, the selection range setter 313 range selects the selection range surrounded by the double-dotted lines, as illustrated in FIGS. 13A to 13D. As a result, the selection range double tapped by the user (illustrated on the right side of each of FIGS. 13A to 13D) is shrunk to smaller than the selection range immediately before the double tapping by the user (illustrated on the left side of each of FIGS. 13A to 13D).

The display processor 315 illustrated in FIG. 2 changes the selection range selected by the selection range setter 313 from the original selection range, and displays the changed selection range in an inverted manner on the screen of the display device 36 (step S117). When one end of the selected selection range is not double tapped (step S116; NO), the selection range is not changed.

Figure 15:
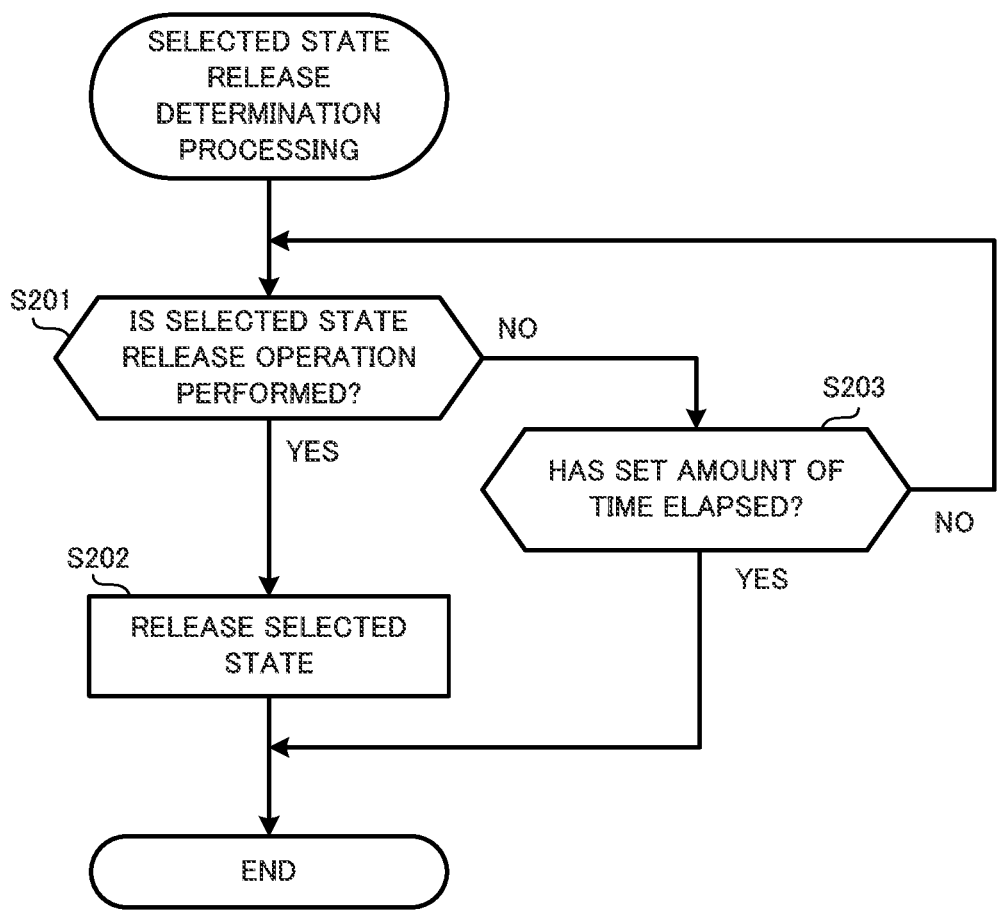
FIG. 15 is a flowchart illustrating the flow of selected state release determination processing in the selection range copy processing illustrated in FIGS. 14A and 14B.

Next, the processing unit 314 of the controller 310 executes selected state release determination processing (step S118). The selected state release determination processing is described in the following while referencing the flowchart illustrated in FIG. 15. The processing unit 314 determines whether a selected state release operation is performed by the user (step S201). This selected state release operation is an operation for releasing the selected state indicated by the selection range. Examples of such operations include a tap operation on a portion, other than the selection range selected by the selection range setter 313, of the screen of the display device 36 by the user, an operation of pressing, by the user, of a Delete key included in the data input section 362 illustrated in FIG. 3, and the like. When the selected state release operation is performed (step S201; YES), the processing unit 314 releases the selected state indicated by the selection range (step S202). Specifically, the processing unit 314 causes the display processor 315 illustrated in FIG. 2 to return the inverted display of the selection range illustrated in FIGS. 4 to 13D to the original display.

When the selected state release operation is not performed (step S201; NO), the processing unit 314 determines whether a predetermined amount of time has elapsed from the start of the selected state release determination processing (step S203). When the predetermined amount of time has elapsed (step S203; YES), the processing unit 314 ends the selected state release determination processing and returns to the flowchart of the selection range copy processing illustrated in FIG. 14A. When the predetermined amount of time has not elapsed (step S203; NO), the processing unit 314 returns to step S201, and repeats steps S201 to S203.

In this case, the processing unit 314 returns to FIG. 14A. The processing unit 314 of the controller 310 determines whether the selected state is released in the selected state release determination processing of step S118 (step S119). When the selected state is released (step S119; YES), the processing unit 314 returns to step S101, and repeats the processing of steps S101 to S120.

Figure 16:
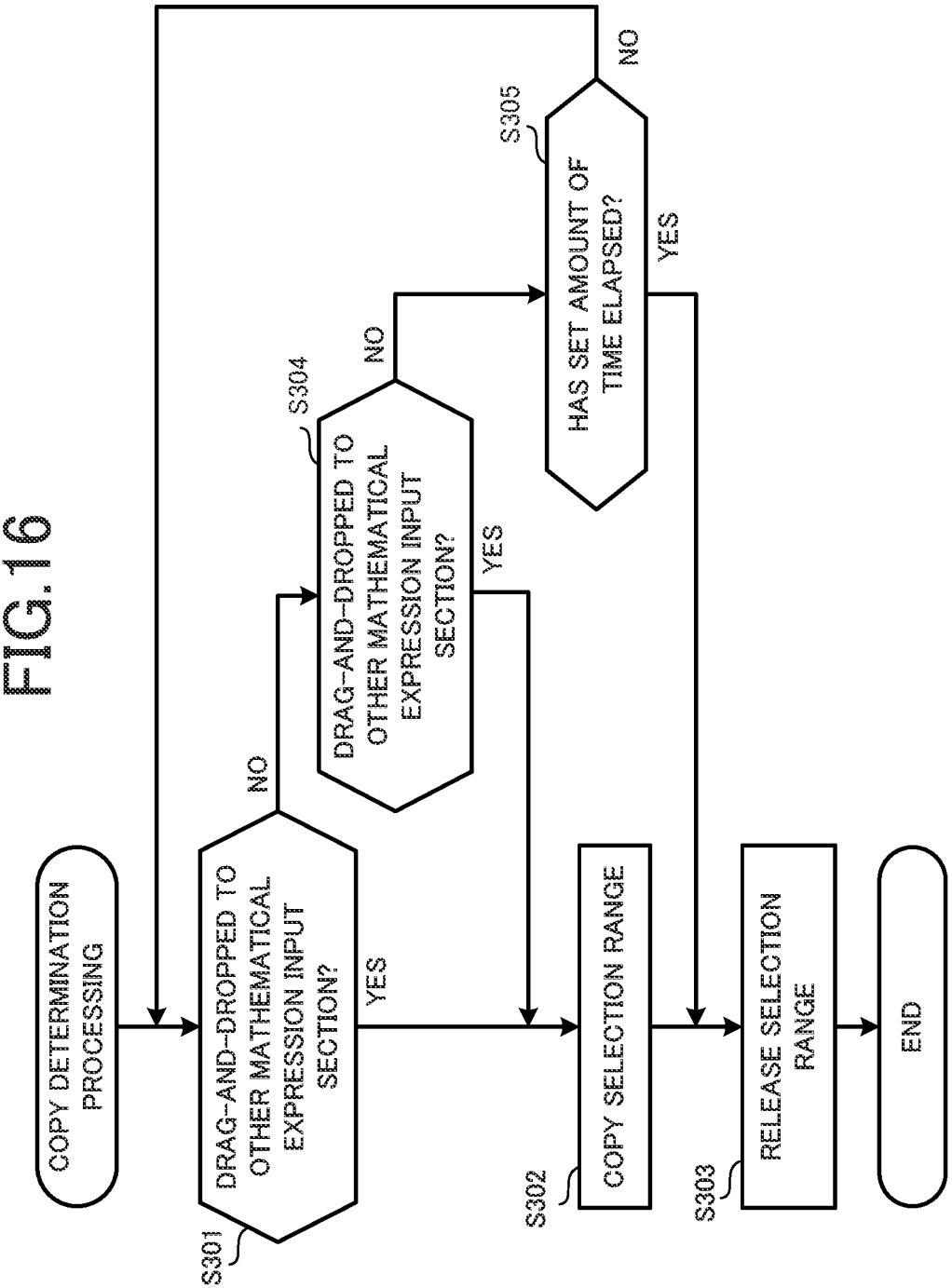
FIG. 16 is a flowchart of the flow of copy determination processing in the selection range copy processing illustrated in FIGS. 14A and 14B.

When the selected state is not released (step S119; NO), the processing unit 314 of the controller 310 executes copy determination processing (step S120). The copy determination processing is described in the following while referencing the flowchart illustrated in FIG. 16. The processing unit 314 determines whether the selection range selected by the selection range setter 313 is drag-and-dropped to another mathematical expression input section 363 by the user on the screen of the display device 36 (step S301).

When the selection range is drag-and-dropped to another mathematical expression input section 363 (step S301; YES), the processing unit 314 copies the selection range to the other mathematical expression input section 363 (step S302). Then, the processing unit 314 releases the selection range (step S303). Specifically, the processing unit 314 causes the display processor 315 illustrated in FIG. 2 to return the inverted display of the selection range illustrated in FIGS. 4 to 11 to the original display. The processing unit 314 ends the copy determination processing and returns to the flowcharts of the selection range copy processing illustrated in FIGS. 14A and 14B. The processing unit 314 returns to step S101, and repeats the processing of steps S101 to S120.

When the selection range is not drag-and-dropped to another mathematical expression input section 363 (step S302; NO), the processing unit 314 determines again whether the selection range selected by the selection range setter 313 is drag-and-dropped to another mathematical expression input section 363 by the user on the screen of the display device 36 (step S304). When the selection range is drag-and-dropped to another mathematical expression input section 363 (step S304; YES), the processing unit 314 executes steps S302 and S303. The processing unit 314 ends the copy determination processing and returns to the flowcharts of the selection range copy processing illustrated in FIGS. 14A and 14B. The processing unit 314 returns to step S101, and repeats the processing of steps S101 to S120.

When the selection range is not drag-and-dropped to another mathematical expression input section 363 (step S304; NO), the processing unit 314 determines whether the predetermined amount of time has elapsed from the start of the copy determination processing (step S305). When the predetermined amount of time has elapsed (step S305; YES), the processing unit 314 releases the selection range (step S303). Specifically, the processing unit 314 causes the display processor 315 illustrated in FIG. 2 to return the inverted display of the selection range illustrated in FIGS. 4 to 13D to the original display. Then, the processing unit 314 ends the copy determination processing and returns to the flowcharts of the selection range copy processing illustrated in FIGS. 14A and 14B. The processing unit 314 returns to step S101, and repeats the processing of steps S101 to S120.

When the predetermined amount of time has not elapsed (step S305; NO), the processing unit 314 returns to step S301, and repeats the processing of steps S301 to S305.

As described above, the information processing device 3 according to the present embodiment can determine the type of a character, among a plurality of characters included in a mathematical expression displayed on the screen of the display device 36, tapped on the screen by the user; identify, on the basis of the determined character, an associated character, among the plurality of characters, that is associated with the tapped character; and set, among the plurality of characters, the selection-operated character and the associated character as the selection range of the selected character. As such, the user can simply select an appropriate range of characters in a mathematical expression.

With the information processing device 3 according to the present embodiment, it is possible to identify different characters as the associated character in accordance with the type of the character tapped on the screen by the user, and the number, the order of operations, and the like of the operator. Furthermore, according to the information processing device 3 according to the present embodiment, it is possible to identify different characters as the associated character by any operation method including a single tap, a double tap, a tap and hold, and a draw operation performed by the user on the screen on which the mathematical expression is displayed. As such, the user can simply select characters included in the mathematical expression in accordance with the character tapped on the screen and the operation method performed on the screen.

According to the information processing device 3 according to the present embodiment, the selection range of the selected character can be displayed in an inverted manner on the screen of the display device 36. As such, the user can easily confirm the selection range of the selected character.

Furthermore, according to the information processing device 3 according to the present embodiment, a shrinking operation can be performed for shrinking the selection range in accordance with a selection operation performed by the user on the selection range that is in an already selected state. As such, the user can easily change the selection range of the character as necessary after the selection of the character.

Modified Examples

Note that the present disclosure is not limited to the embodiment described above, and various modifications of portions are possible without departing from the spirit and scope of the present disclosure.

In the embodiment described above, one information processing device 3 is connected to the server 1 via the network 2. However, the present disclosure is not limited thereto, and a configuration is possible in which a desired number of information processing devices 3 are connected to the server 1 via the network 2.

Additionally, in the embodiment described above, processing for setting the selection range of the mathematical expression displayed on the screen of the display device 36 is executed, in the controller 310 of the information processing device 3, on the basis of an input from the user. However, the present disclosure is not limited thereto, and a configuration is possible in which the information processing device 3 perform only the receiving of the input from the user and the screen displaying on the display device 36, and the server 1 performs the various processings such as the processing for setting the selection range of the mathematical cal expression, the selection range copy processing, the generation of data to be displayed on the screen of the display device 36, and the like.

Additionally, in the embodiment described above, the input device 34 of the information processing device 3 illustrated in FIG. 1 is mounted on the display device 36 and, as a result, functions as a touch panel serving as both an inputter and a display. However, the present disclosure is not limited thereto, and a configuration is possible in which the selection operation by the user performed in the embodiment described above can be performed using a mouse as the input device 34. In such a case, a tap on the touch panel corresponds to a click on the mouse. Additionally, a double tap on the touch panel corresponds to a double click on the mouse.

In the embodiment described above, the selection operations performed by the user, namely the tap, the double tap, the tap and hold, and the draw processings are each described as individual processings. However, the present disclosure is not limited thereto, and each of the tap, the double tap, the tap and hold, and the drawing processings may be interchanged. For example, the tap and the double tap processings may be interchanged, the double tap and the tap and hold processings may be interchanged, and the like.

Additionally, in the embodiment described above, the server 1 computes the data on the basis of the mathematical expression, the computation command, and the data for computation that are received from the information processing device 3, and displays the computation results on the information processing device 3. However, the present disclosure is not limited thereto, and a configuration is possible in which the information processing device 3 alone can compute the data on the basis of the mathematical expression, the computation command, and the data for computation, and display the computation results.

Additionally, in the embodiment described above, the color of the selected character and the color of the background of the selected character are displayed in an inverted manner (here, for the sake of convenience, the selection range of the selected character is surrounded by the double-dotted lines), and displayed on the screen of the display device 36. However, the present disclosure is not limited thereto, and a configuration is possible in which the selected character and the non-selected characters are displayed in a character forms such as a different colors, fonts, italics, bolds, or the like. Additionally, a configuration is possible in which the selection range of the selected character is not displayed on the screen of the display device 36 in an inverted manner or the like.

Figure 17A:
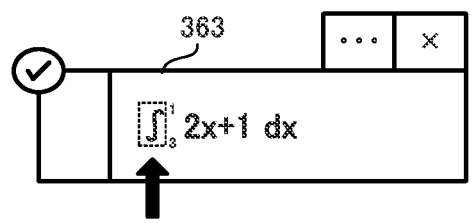
FIG. 17A is a drawing illustrating a modified example of a change of a selection range in a case in which a special operator of a mathematical expression is tapped, according to an embodiment of the present disclosure.
Figure 17B:
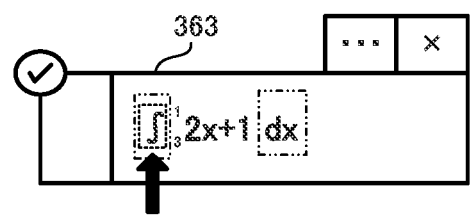
FIG. 17B is a drawing illustrating an example of a change of a selection range in a case in which the special operator tapped in FIG. 17A is tapped again.
Figure 17C:
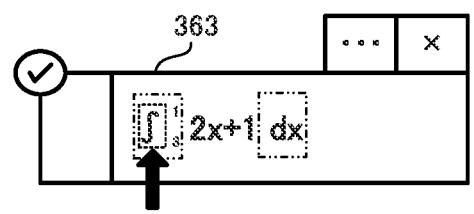
FIG. 17C is a drawing illustrating an example of a change of a selection range in a case in which the special operator that is tapped in FIG. 17B is tapped again.
Figure 17D:
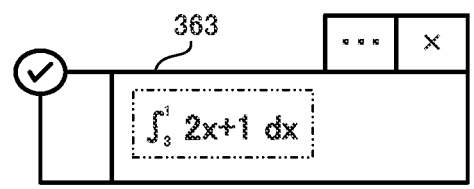
FIG. 17D is a drawing illustrating an example of a change of a selection range in a case in which the special operator tapped in FIG. 17C is tapped again.

Additionally, in the embodiment described above, as illustrated in FIGS. 5A to 5D, when the user taps, using the input device 34 illustrated in FIG. 1 and on the screen, a special operator displayed on the display device 36, in accordance with that tap, the tapped special operator and the accompanying parameters are selected. However, the present disclosure is not limited thereto and, for example, a configuration is possible in which, when, as illustrated in FIG. 17A, "$f$", which is a special operator, is tapped, only "dx" of the parameters accompanying the special operator "$f$" is selected, and the interval settings "1" and "3" are not selected, as illustrated in FIG. 17B. Furthermore, a configuration is possible in which, when the special operator "$f$" is tapped in this state, the interval settings "1" and "3" are selected in addition to the accompanying parameter "dx", as illustrated in FIG. 17C. Moreover, a configuration is possible in which, when the special operator "$f$" is tapped again in this state, "2x+1", which is a mathematical expression to be computed, is also selected, as illustrated in FIG. 17D.

Figure 18A:
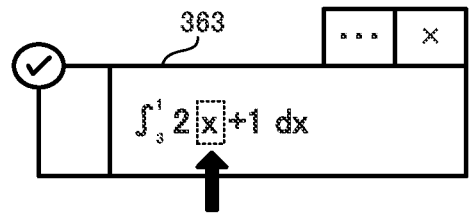
FIG. 18A is a drawing illustrating a modified example of a change of a selection range in a case in which a non-operator of a mathematical expression is tapped, according to an embodiment of the present disclosure.
Figure 18B:
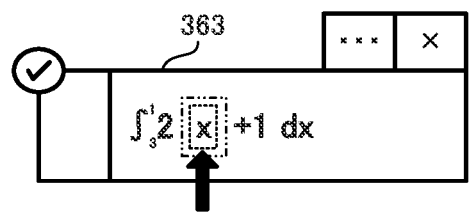
FIG. 18B is a drawing illustrating an example of a change of a selection range in a case in which the non-operator tapped in FIG. 18A is tapped again.
Figure 18C:
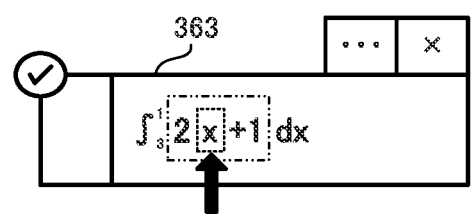
FIG. 18C is a drawing illustrating an example of a change of a selection range in a case in which the non-operator tapped in FIG. 18B is tapped again.
Figure 18D:
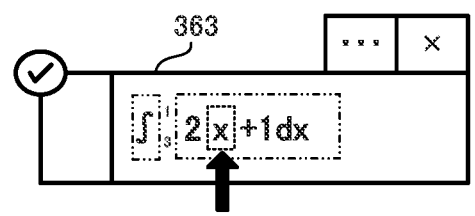
FIG. 18D is a drawing illustrating a change of a selection range in a case in which the non-operator tapped in FIG. 18C is tapped again.
Figure 18E:
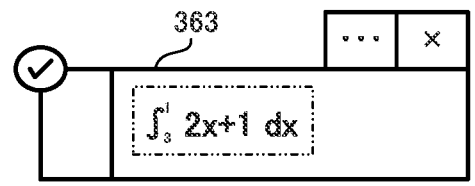
FIG. 18E is a drawing illustrating an example of a change of a selection range in a case in which the non-operator tapped in FIG. 18D is tapped again.

Additionally, in the embodiment described above, when the user taps, using the input device 34 illustrated in FIG. 1 and on the screen, an operand and/or an operator included in the mathematical expression displayed on the display device 36, the selection range selected in accordance with the tapped operand, operator, or the like changes. However, the present disclosure is not limited thereto and, for example, a configuration is possible in which, when "x" of the operand "2x" is tapped as illustrated in FIG. 18A, only the tapped "x" is selected as illustrated in FIG. 18B. Thereafter, when "x" is tapped again, as illustrated in FIG. 18C, "2x+1", which is the smallest mathematical expression including "2" that accompanies "x" and the operator "+" that targets "2x", is selected. When "x" is tapped again, as illustrated in FIG. 18D, the special operator "P" that targets "2x+1" and "dx" of the parameters accompanying that special operator are selected. When "x" is tapped again in this state, as illustrated in FIG. 18E, in addition to the parameter "dx", the interval settings "1" and "3" accompanying the special operator "∫" are also selected.

Additionally, in the embodiment described above, as the shrinking operation of the selection range, in a case in which one end of the selection range of the selected character is selection-operated by the user, the selection range is shrunk to a range of a portion of the selection range, that is, to a range including the operand located on the end of the side opposite the selection-operated one end of the selection range, or the smallest mathematical expression. However, the present disclosure is not limited thereto and, for example, a configuration is possible in which the selection range is shrunk to a range of a portion of the selection range, that is, to a range including the operand located at the selection-operated end of the selection range, or the smallest mathematical expression. Additionally, a configuration is possible in which the selected state of the operand located at the selection-operated end of the selection range, or of the smallest mathematical expression is released and, as a result, the selection range is shrunk. Furthermore, a configuration is possible in which, in a case in which a portion of the selection range is selection-operated by the user, the selection range is shrunk to a range of a portion of the selection range, that is, to a range including a character included in the selection-operated portion of the selection range. Conversely, a configuration is possible in which the selection range is shrunk to a range including a character not included in the selection-operated portion of the selection range.

Additionally, in the embodiment described above, "∫", "Σ", "log", and the like are described as examples of the special operators. However, the present disclosure is not limited thereto, and a configuration is possible in which the same processing as in the present embodiment is carried out using other existing special operators such as "lim", "sin", and the like as the special operators.

The method of application to a program in the present embodiment may be determined as desired. For example, a program can be applied by storing the program on a non-transitory computer-readable recording medium such as a flexible disc, a compact disc (CD) ROM, a digital versatile disc (DVD) ROM, a memory card, or the like. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting a display selection processing program and, under the control of an operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-155137, filed on Sep. 16, 2020, and Japanese Patent Application No. 2021-113379, filed on Jul. 8, 2021, of which the entirety of the disclosures is incorporated by reference herein.

INDUSTRIAL APPLICABILITY

The present disclosure can be suitably used in an information processing method, an information processing device, and a system including the information processing device.

REFERENCE SIGNS LIST

1 Server
2 Network
3 Information processing device
31 Processor
32 Memory
33 Storage device
34 Input device
36 Display device
37 Communication device
38 Bus
100 System
310 Controller
311 Determiner
312 Identifier
313 Selection range setter
314 Processing unit
315 Display processor
361 Data display section
362 Data input section
363 Mathematical expression input section

The invention claimed is:

1. An information processing method to be performed by an information processing device, the information processing method comprising:
   determining a type of a selected character, among a plurality of characters included in a displayed mathematical expression, that is selection-operated by a user;
   identifying, based on the determined type of the selected character, an associated character, among the plurality of characters, that is associated with the selected character; and
   setting, a range including the selected character and the associated character among the plurality of characters as a selection range of the character selected by the user,
   wherein the plurality of characters included in the mathematical expression includes an operand and an operator, wherein, when the selected character is the operand, the operator that targets the selected operand is identified as the associated character, and wherein, when there are two of the operator that targets the operand, the operator with higher operational precedence is identified as the associated character.

2. The information processing method according to claim 1, wherein, when the selected character is the operator, an operand that is a target of the selected operator is identified as the associated character.

3. The information processing method according to claim 1, wherein the plurality of characters included in the mathematical expression includes a special operator and a parameter accompanying the special operator, and wherein, when the selected character is the special operator, the parameter accompanying the selected special operator is identified as the associated character.

4. The information processing method according to claim 3, wherein, when the special operator included in the selection range of the selected character is selection-operated by the user, the operand that is a target of the special operator is identified as the associated character.

5. The information processing method according to claim 1, wherein when there are two of the operator that targets the operand, and an operational precedence of each of the two of the operator are substantially equal, the two of the operator are both identified as the associated character.

6. The information processing method according to claim 1, further comprising:

shrinking the selection range of the selected character in accordance with a predetermined shrinking operation being executed by the user.

7. The information processing method according to claim 6, wherein in a case in which a portion of the selection range of the selected character is selection-operated by the user due to the execution of the shrinking operation performed by the user, the selection range is shrunk to a range of a portion of the selection range, that is, to a range including a character included in the selection-operated portion of the selection range, or to a range including a character not included in the selection-operated portion of the selection range.

8. The information processing method according to claim 6, wherein in a case in which one end of the selection range of the selected character is selection-operated by the user due to the execution of the shrinking operation performed by the user, the selection range is shrunk to a range of a portion of the selection range, that is, to an operand located at an end of a side opposite the one end of the selection-operated selection range, or to a range including a smallest mathematical expression.

9. The information processing method according to claim 1, further comprising:

identifying an operation method performed by the user for selecting the character; and identifying the associated character based on the type of the character and a determined selection method.

10. The information processing method according to claim 9, wherein the operation method performed by the user is any of a single tap, a double tap, a tap and hold, and a draw operation performed on a screen on which the mathematical expression is displayed.

11. The information processing method according to claim 10, wherein, when, among the operation method performed by the user, a single tap or a tap and hold is repeated, the identified associated character changes in accordance with a number of times the single tap or the tap and hold is repeated.

12. The information processing method according to claim 1, further comprising:

displaying the selection range of the selected character in displayed such that a color of the selected character and a color of a background of the selected character are inverted.

13. The information processing method according to claim 1, further comprising:

releasing a selected state of a character set by the user in accordance with a release operation performed by the user.

14. A system comprising:

a terminal device and a server connected to the terminal device via a network, wherein the terminal device and the server cooperate to execute the information processing method according to claim 1.

15. An information processing device comprising:

one or more processors configured to:

determine a type of a selected character, among a plurality of characters included in a displayed mathematical expression, that is selection-operated by a user;

identify, based on the determined type of the selected character, an associated character, among the plurality of characters, that is associated with the character that is selection-operated; and set, a range including the selected character and the associated character among the plurality of characters as a selection range of the character selected by the user, wherein the plurality of characters included in the mathematical expression includes an operand and an operator, wherein, when the selected character is the operand, the operator that targets the selected operand is identified as the associated character, and wherein, when there are two of the operator that targets the operand, the operator with higher operational precedence is identified as the associated character.

16. A non-transitory computer-readable storage medium storing a program for causing a computer to at least perform:

determining a type of a selected character, among a plurality of characters included in a displayed mathematical expression, that is selection-operated by a user;

identifying, based on the determined type of the selected character, an associated character, among the plurality of characters, that is associated with the character that is selection-operated; and setting, a range including the selected character and the associated character among the plurality of characters as a selection range of the character selected by the user, wherein the plurality of characters included in the mathematical expression includes an operand and an operator, wherein, when the selected character is the operand, the operator that targets the selected operand is identified as the associated character, and wherein, when there are two of the operator that targets the operand, the operator with higher operational precedence is identified as the associated character.

17. An information processing method to be performed by an information processing device, the information processing method comprising:
   determining a type of a selected character, among a plurality of characters included in a displayed mathematical expression, that is selection-operated by a user;
   identifying, based on the determined type of the selected character, an associated character, among the plurality of characters, that is associated with the selected character;
   setting, a range including the selected character and the associated character among the plurality of characters as a selection range of the character selected by the user; and
   shrinking the selection range of the selected character in accordance with a predetermined shrinking operation being executed by the user,
   wherein, in a case in which one end of the selection range of the selected character is selection-operated by the user due to the execution of the shrinking operation performed by the user, the selection range is shrunk to a range of a portion of the selection range, that is, to an operand located at an end of a side opposite the one end of the selection-operated selection range, or to a range including a smallest mathematical expression.

18. An information processing method to be performed by an information processing device, the information processing method comprising:
   determining a type of a selected character, among a plurality of characters included in a displayed mathematical expression, that is selection-operated by a user;
   identifying, based on the determined type of the selected character, an associated character, among the plurality of characters, that is associated with the selected character; and
   setting, a range including the selected character and the associated character among the plurality of characters as a selection range of the character selected by the user,
   wherein the information processing method further comprises:
      identifying an operation method performed by the user for selecting the character; and
      identifying the associated character based on the type of the character and a determined selection method,
      wherein the operation method performed by the user is any of a single tap, a double tap, a tap and hold, and a draw operation performed on a screen on which the mathematical expression is displayed, and
      wherein when, among the operation method performed by the user, the single tap or the tap and hold is repeated, the identified associated character changes in accordance with a number of times the single tap or the tap and hold is repeated.

* * * * *

UNITED STATES PATENT AND TRADEMARK OFFICE
CERTIFICATE OF CORRECTION

PATENT NO. : 12,124,686 B2
APPLICATION NO. : 18/026496
DATED : October 22, 2024
INVENTOR(S) : Naoya Maeda Page 1 of 1

It is certified that error appears in the above-identified patent and that said Letters Patent is hereby corrected as shown below:

In the Claims

Column 22, Claim 12, Lines 11-12 should read:
displaying the selection range of the selected character such that a color of the selected character and Signed and Sealed this
Thirteenth Day of May, 2025

Coke Morgan Stewart
*Acting Director of the United States Patent and Trademark Office*